US012601867B2

(12) United States Patent
Schultz et al.

(10) Patent No.: US 12,601,867 B2
(45) Date of Patent: Apr. 14, 2026

(54) IMAGE LIGHT GUIDE WITH ZONED DIFFRACTIVE OPTIC

(71) Applicant: Vuzix Corporation, West Henrietta, NY (US)

(72) Inventors: Robert J. Schultz, Victor, NY (US); Marek W. Kowarz, Henrietta, NY (US)

(73) Assignee: Vuzix Corporation, West Henrietta, NY (US)

( * ) Notice: Subject to any disclaimer, the term of this patent is extended or adjusted under 35 U.S.C. 154(b) by 167 days.

(21) Appl. No.: 18/038,963

(22) PCT Filed: Nov. 24, 2021

(86) PCT No.: PCT/US2021/060786
§ 371 (c)(1),
(2) Date: May 25, 2023

(87) PCT Pub. No.: WO2022/115580
PCT Pub. Date: Jun. 2, 2022

(65) Prior Publication Data
US 2023/0417974 A1 Dec. 28, 2023

Related U.S. Application Data

(60) Provisional application No. 63/129,499, filed on Dec. 22, 2020, provisional application No. 63/118,581, filed on Nov. 25, 2020.

(51) Int. Cl.
*F21V 8/00* (2006.01)
*G02B 27/44* (2006.01)

(52) U.S. Cl.
CPC ......... *G02B 6/0016* (2013.01); *G02B 6/0036* (2013.01); *G02B 27/44* (2013.01)

(58) Field of Classification Search
CPC ..... G02B 6/0016; G02B 6/0036; G02B 27/44
(Continued)

(56) References Cited

U.S. PATENT DOCUMENTS

2018/0081176 A1 3/2018 Olkkonen et al.
2019/0056591 A1 2/2019 Tervo et al.
(Continued)

FOREIGN PATENT DOCUMENTS

JP 2020524296 A 8/2020
JP 2022520472 A 3/2022
(Continued)

OTHER PUBLICATIONS

United States Patent & Trademark Office (ISA/US), International Search Report and Written Opinion in PCT/US2021/060786, dated Feb. 15, 2022, 7 pages.

*Primary Examiner* — Jerry M Blevins
(74) *Attorney, Agent, or Firm* — Harter Secrest & Emery LLP; Jacob D. Merrill, Esq.

(57) ABSTRACT

An image light guide for conveying a virtual image, including a waveguide, an in-coupling diffractive optic operable to direct image-bearing light beams into the waveguide, and an out-coupling diffractive optic operable to direct the image-bearing light beams from the waveguide toward an eyebox. The out-coupling diffractive optic having two or more zones each including a set of diffractive features, wherein a first zone includes a first set of diffractive features and a second zone includes a second set of diffractive features and is located adjacent to the first zone. The out-coupling diffractive optic includes a first interface region formed by the first zone and the second zone, and the first interface region includes a first set of sub-regions and a second set of sub-regions. The first set of sub-regions includes the first set
(Continued)

of diffractive features, and the second set of sub-regions includes the second set of diffractive features.

20 Claims, 22 Drawing Sheets

(58) Field of Classification Search
    USPC ......................................................... 385/129
    See application file for complete search history.

(56) References Cited

U.S. PATENT DOCUMENTS

| | | | |
|---|---|---|---|
| 2020/0166691 A1* | 5/2020 | Vartiainen | .............. G02B 5/188 |
| 2020/0209484 A1 | 7/2020 | Lee et al. | |
| 2020/0264378 A1 | 8/2020 | Grant et al. | |
| 2021/0057148 A1 | 2/2021 | Kondo | |
| 2021/0382308 A1 | 12/2021 | Phelan et al. | |
| 2022/0206300 A1 | 6/2022 | Park et al. | |

FOREIGN PATENT DOCUMENTS

| | | | |
|---|---|---|---|
| JP | 2022524495 A | 5/2022 | |
| JP | 2022528594 A | 6/2022 | |
| WO | 2018220266 A1 | 12/2018 | |
| WO | 2020168348 A1 | 8/2020 | |
| WO | 2020171666 A1 | 8/2020 | |
| WO | 2020188234 A1 | 9/2020 | |
| WO | 2020191224 A1 | 9/2020 | |
| WO | 2020212647 A1 | 10/2020 | |
| WO | 2021252672 A1 | 12/2021 | |
| WO | 2022046648 A1 | 3/2022 | |

* cited by examiner

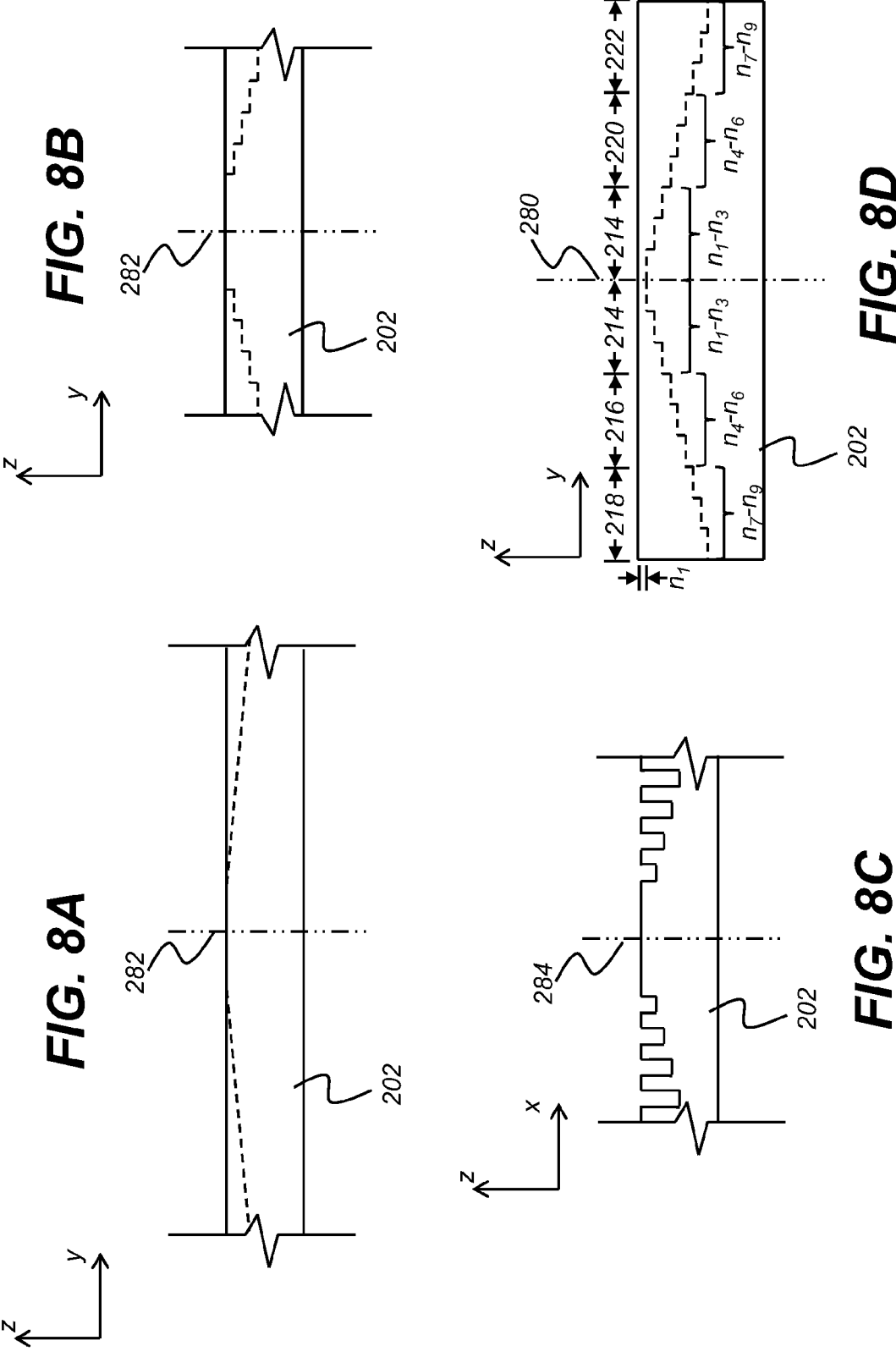

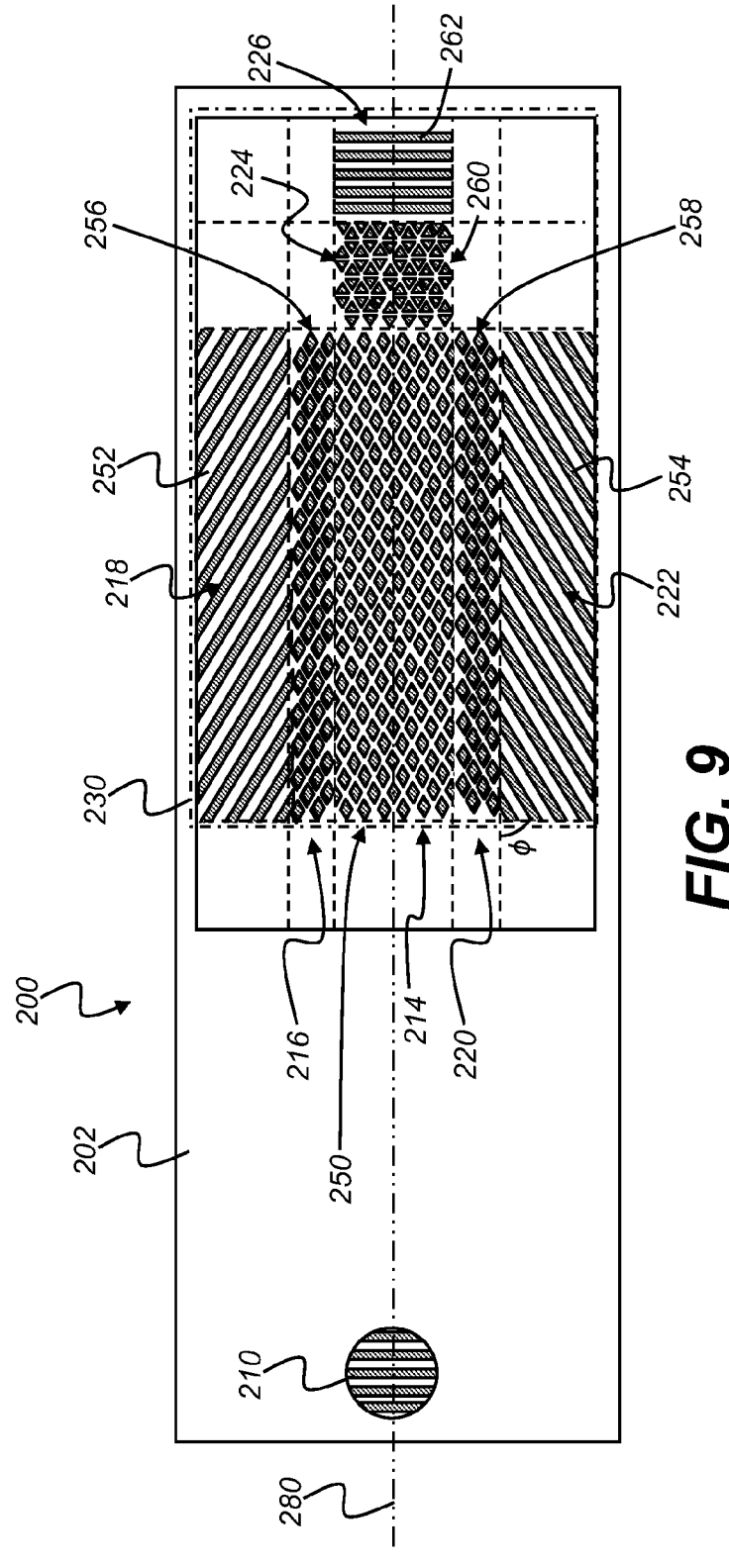
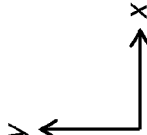
*FIG. 9*

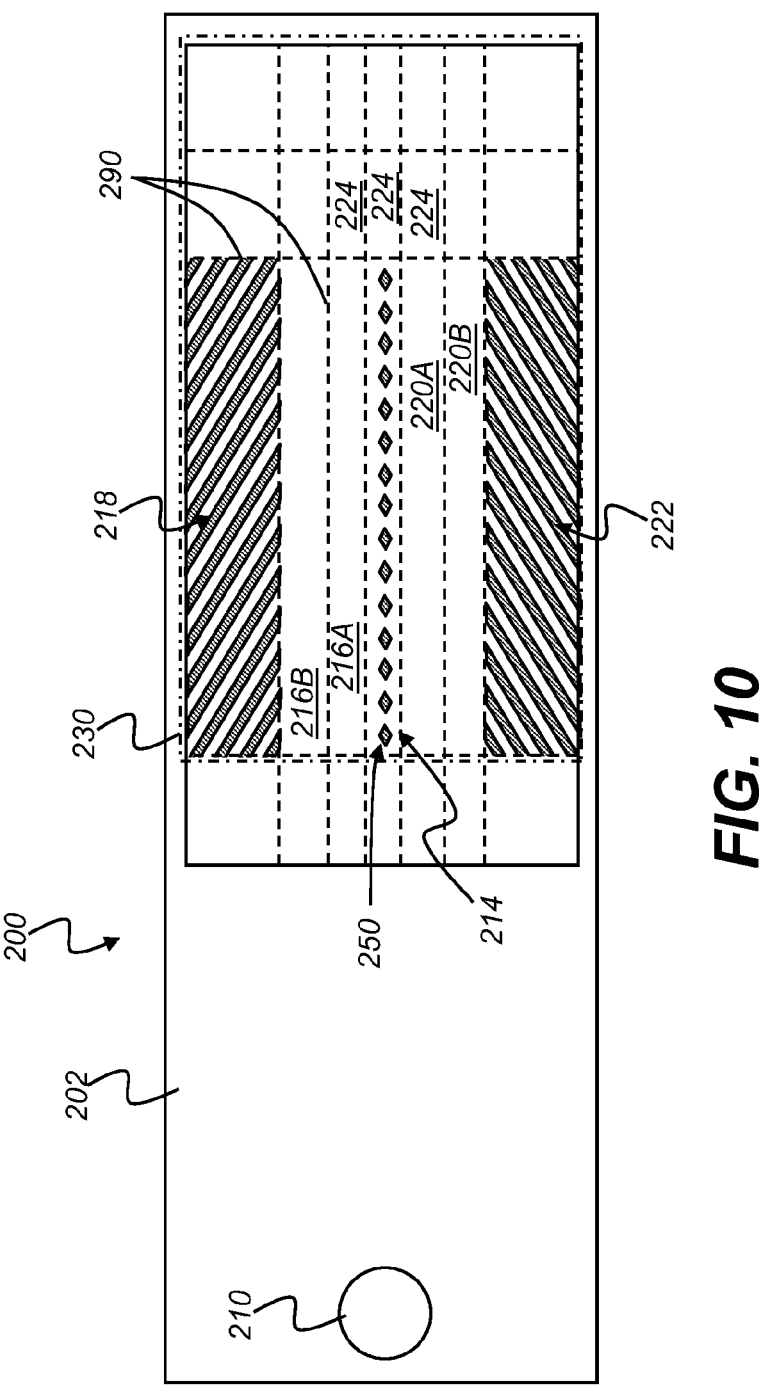
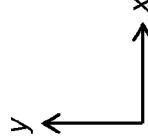
FIG. 10

IMAGE LIGHT GUIDE WITH ZONED DIFFRACTIVE OPTIC

TECHNICAL FIELD

The present disclosure relates generally to electronic displays and more particularly to displays utilizing an image light guide having diffractive optics.

BACKGROUND

Head-Mounted Displays (HMDs) and virtual image near-eye displays are being developed for a range of diverse uses, including military, commercial, industrial, fire-fighting, and entertainment applications. For many of these applications, there is value in forming a virtual image that can be visually superimposed over the real-world image that lies in the field of view of the HMD user. An optical image light guide may convey image-bearing light to a viewer in a narrow space for directing the virtual image to the viewer's pupil and enabling this superposition function.

In conventional image light guides, collimated, relatively angularly encoded light beams from an image source are coupled into a planar waveguide by an input coupling such as an in-coupling diffractive optic, which can be mounted or formed on a surface of the planar waveguide or buried within the waveguide. After propagating along the waveguide, the diffracted light can be directed back out of the waveguide by an out-coupling diffractive optic, which can be arranged to provide pupil expansion along one dimension of the virtual image. In addition, a turning optic can be positioned along the waveguide between the in-coupling and out-coupling diffractive optics to provide pupil expansion in an orthogonal dimension of the virtual image. The image-bearing light output from the waveguide provides an expanded eyebox for the viewer.

It can be appreciated that there would be advantages to a display apparatus having improved diffraction efficiency, image-bearing light output intensity, and uniformity across the entire output aperture.

SUMMARY

It is an object of the present disclosure to advance the art of virtual image presentation particularly when using compact head-mounted devices and similar imaging apparatus. According to an aspect of the present disclosure, in a first exemplary embodiment, there is provided an image light guide for conveying a virtual image, including a waveguide, an in-coupling diffractive optic operable to direct image-bearing light beams into the waveguide, and an out-coupling diffractive optic operable to direct the image-bearing light beams from the waveguide toward an eyebox. The out-coupling diffractive optic having a first zone located adjacent to a second zone, wherein the first zone includes a first set of diffractive features and said second zone includes a second set of diffractive features. The out-coupling diffractive optic having a first interface region formed by the first zone and the second zone. The first interface region including one or more first sub-regions and one or more second sub-regions, the first sub-regions having the first set of diffractive features and the second sub-regions having the second set of diffractive features.

BRIEF DESCRIPTION OF THE DRAWINGS

The accompanying drawings are incorporated herein as part of the specification. The drawings described herein illustrate embodiments of the presently disclosed subject matter and are illustrative of selected principles and teachings of the present disclosure. However, the drawings do not illustrate all possible implementations of the presently disclosed subject matter and are not intended to limit the scope of the present disclosure in any way.

FIGS. 8A, 8B, 8C, 8D are schematics showing progressive diffractive feature depth according to exemplary embodiments of the presently disclosed subject matter.

FIG. 9 is a top view of an image light guide having a zoned out-coupling diffractive optic according to an exemplary embodiment of the presently disclosed subject matter.

FIG. 10 is a top view of an image light guide having a zoned out-coupling diffractive optic according to an exemplary embodiment of the presently disclosed subject matter.

DETAILED DESCRIPTION

Figure 1:
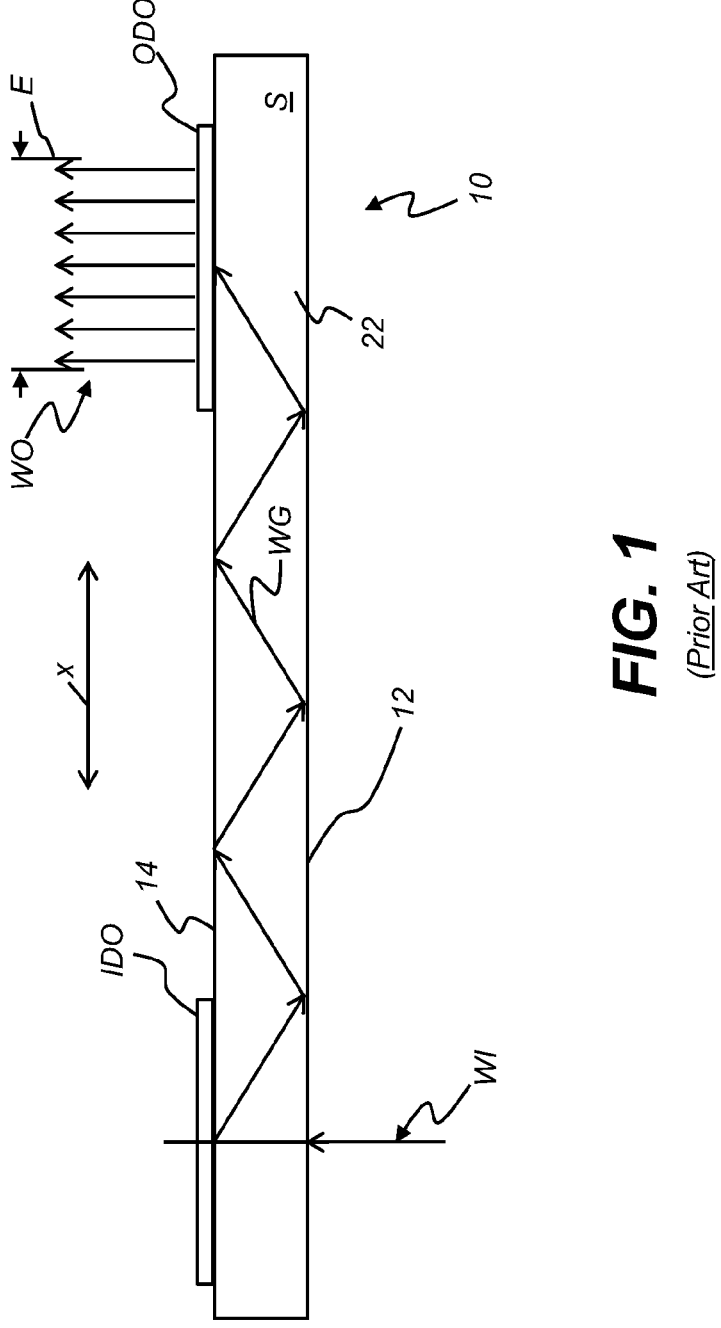
FIG. 1 is a schematic diagram showing a simplified cross-sectional view of an image light guide for conveying a virtual image with an out-coupling diffractive optic providing pupil expansion along one dimension of the virtual image.

It is to be understood that the invention may assume various alternative orientations and step sequences, except where expressly specified to the contrary. It is also to be understood that the specific assemblies and systems illustrated in the attached drawings and described in the following specification are simply exemplary embodiments of the inventive concepts defined herein. Hence, specific dimensions, directions, or other physical characteristics relating to the embodiments disclosed are not to be considered as limiting, unless expressly stated otherwise. Also, although they may not be, like elements in various embodiments described herein may be commonly referred to with like reference numerals within this section of the application.

Where they are used herein, the terms "first," "second," and so on, do not necessarily denote any ordinal, sequential, or priority relation, but are simply used to more clearly distinguish one element or set of elements from another, unless specified otherwise.

Where used herein, the term "exemplary" is meant to indicate "an example of," and is not intended to suggest any preferred or ideal embodiment.

Where they are used herein, the terms "viewer," "operator," "observer," and "user" are considered to be equivalent and refer to the person who views virtual images conveyed by one of the considered image light guides, especially as arranged in an HMD viewing device.

Where used herein, the term "energizable" relates to a device or set of components that perform an indicated function upon receiving power and, optionally, upon receiving an enabling signal.

Where used herein, the term "set" refers to a non-empty set, as the concept of a collection of elements or members of a set is widely understood in elementary mathematics. The term "subset," unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

Where they are used herein, the phrases "optical infinity" and "at infinity" correspond to conventional usage in the camera and imaging arts, indicating image formation using one or more bundles of substantially collimated light, so that the focus distance exceeds at least about 4 meters.

Where they are used herein, the terms "coupled" or "coupler" in the context of optics refer to a connection by which light travels from one optical medium or device to another optical medium or device through an intermediate structure that facilitates the connection.

Where they are used herein, the terms "beam expander" and "pupil expander" are considered synonymous and are used interchangeably herein. These terms are used generally herein to refer to enlarging the area of overlap among angularly related beams for conveying virtual images.

As used herein, the term "beam expansion" is intended to mean replication of a beam via multiple encounters with an optical element to provide exit pupil expansion in one or more directions. Similarly, as used herein, to "expand" a beam, or a portion of a beam, is intended to mean replication of a beam via multiple encounters with an optical element to provide exit pupil expansion in one or more directions.

An optical system, such as a HMD, can produce a virtual image. In contrast to methods for forming a real image, a virtual image is not formed on a display surface. That is, if a display surface were positioned at the perceived location of a virtual image, no image would be formed on that surface. Virtual images have a number of inherent advantages for augmented reality presentation. For example, the apparent size of a virtual image is not limited by the size or location of a display surface. Additionally, the source object for a virtual image may be small; for example, a magnifying glass provides a virtual image of an object. In comparison with systems that project a real image, a more realistic viewing experience can be provided by forming a virtual image that appears to be some distance away. Providing a virtual image also obviates the need to compensate for screen artifacts, as may be necessary when projecting a real image.

An image light guide may utilize image-bearing light from a light source such as a projector to display a virtual image. For example, collimated, relatively angularly encoded, light beams from a projector are coupled into a planar waveguide by an input coupling such as an in-coupling diffractive optic, which can be mounted or formed on a surface of the planar waveguide or buried within the waveguide. Such diffractive optics can be formed as diffraction gratings, holographic optical elements (HOEs) or in other known ways. For example, the diffraction grating can be formed by surface relief. After propagating along the waveguide, the diffracted light can be directed back out of the waveguide by a similar output coupling such as an out-coupling diffractive optic, which can be arranged to provide pupil expansion along at least one direction. In addition, a turning grating can be positioned on/in the waveguide to provide pupil expansion in at least one other direction. The image-bearing light output from the waveguide provides an expanded eyebox for the viewer.

As illustrated in FIG. 1, an image light guide 10 may comprise a planar waveguide 22 having plane-parallel surfaces. The waveguide 22 comprises a transparent substrate S having an outer surface 12 and an inner surface 14 located opposite the outer surface 12. In this example, an in-coupling diffractive optic IDO and an out-coupling diffractive optic ODO are arranged on the inner surface 14 and the in-coupling diffractive optic IDO is a reflective type diffraction grating through which image-bearing light WI is coupled into the planar waveguide 22. However, the in-coupling diffractive optic IDO could alternately be a volume hologram or other holographic diffraction element, or other type of optical component that provides diffraction for the incoming, image-bearing light WI. The in-coupling diffractive optic IDO can be located on the outer surface 12 or the inner surface 14 of the planar waveguide 22 and can be of a transmissive or reflective type depending upon the direction from which the image-bearing light WI approaches the planar waveguide 22.

When used as a part of a virtual display system, the in-coupling diffractive optic IDO couples the image-bearing light WI from a real image source into the substrate S of the planar waveguide 22. Any real image or image dimension is first converted into an array of overlapping angularly related beams encoding the different pixel positions within an image for presentation to the in-coupling diffractive optic IDO. The image-bearing light WI is diffracted and at least a portion of the image-bearing light WI is thereby redirected by the in-coupling diffractive optic IDO into the planar waveguide 22 as image-bearing light WG for further propagation along the planar waveguide 22 by Total Internal Reflection ("TIR"). Although diffracted into a generally more condensed range of angularly related beams in keeping with the boundaries set by TIR, the image-bearing light WG preserves the image information in an encoded form. The out-coupling diffractive optic ODO receives the encoded image-bearing light WG and diffracts at least a portion of the image-bearing light WG out of the planar waveguide 22 as the image-bearing light WO toward the intended location of a viewer's eye. Generally, the out-coupling diffractive optic ODO is designed symmetrically with respect to the in-coupling diffractive optic IDO to restore the original angular relationships of the image-bearing light WI among outputted angularly related beams of the image-bearing light WO. However, to increase one direction of overlap among the angularly related beams in a so-called eyebox E within which the virtual image can be seen, the out-coupling diffractive optic ODO is arranged to encounter the image-bearing light WG multiple times and to diffract only a portion of the image-bearing light WG on each encounter. The multiple encounters along the length of the out-coupling optic in the direction of propagation have the effect of expanding one direction of the eyebox within which image-bearing light beams overlap. The expanded eyebox E decreases sensitivity to the position of a viewer's eye for viewing the virtual image.

Out-coupling diffractive optics with refractive index variations along a single direction can expand one direction of the eyebox in their direction of propagation along the waveguide via multiple encounters of the image-bearing light beams with the out-coupling diffractive optic causing replication of the out-coupled image-bearing light beam. In addition, out-coupling diffractive optics with refractive index variations along a second direction can expand a second direction of the eyebox and provide two-directional expansion of the eyebox. The refractive index variations along a first direction of the out-coupling diffractive optic can be arranged to diffract a portion of each beam's energy out of the waveguide upon each encounter therewith through a desired first order of diffraction, while another portion of the beam's energy is preserved for further propagation in its original direction through a zero order of diffraction. The refractive index variations along a second direction of the out-coupling diffractive optic can be arranged to diffract a portion of each beam's energy upon each encounter therewith through a desired first order of diffraction in a direction angled relative to the beam's original direction of propagation, while another portion of the beam's energy is preserved for further propagation in its original direction through a zero order of diffraction.

The out-coupling diffractive optic ODO is shown as a transmissive type diffraction grating arranged on the inner surface 14 of the planar waveguide 22. However, similar to the in-coupling diffractive optic IDO, the out-coupling diffractive optic ODO can be located on the outer surface 12 or the inner surface 14 of the planar waveguide 22 and be of a transmissive or reflective type in a combination that depends upon the direction through which the image-bearing light WG is intended to exit the planar waveguide 22.

Figure 2:
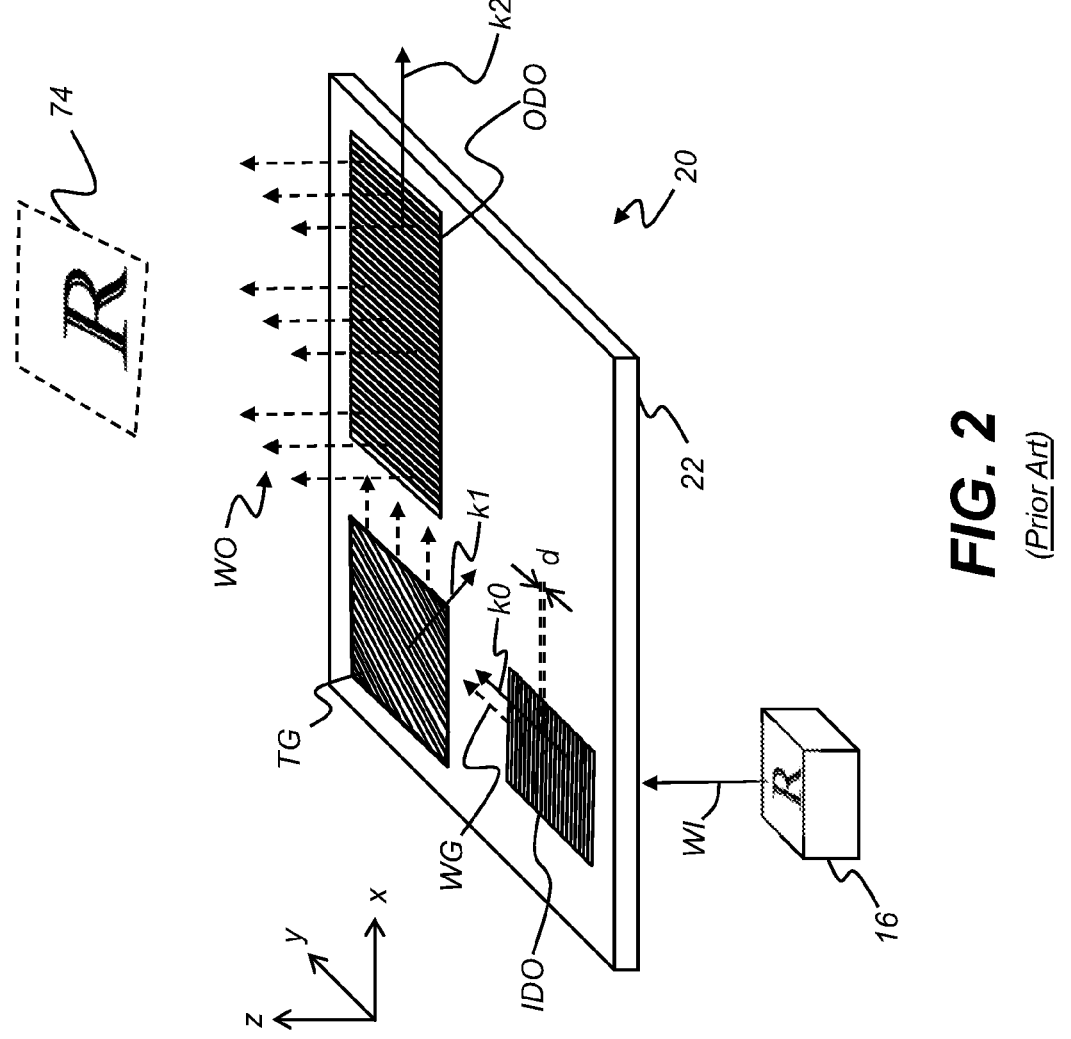
FIG. 2 is a schematic diagram showing a perspective view of an image light guide for conveying a virtual image with a turning grating in addition to an out-coupling diffractive optic providing pupil expansion along two dimensions of the virtual image.

As illustrated in FIG. 2, an image light guide 20 may be arranged for expanding an eyebox 74 in two direction, i.e., along both x- and y-axes of the intended image. To achieve a second dimension of beam expansion, the in-coupling diffractive optic IDO, having a grating vector k0, is oriented to diffract a portion of the image-bearing light WI toward an intermediate turning grating TG, having a grating vector k1, which is oriented to diffract a portion of the image-bearing light WG in a reflective mode toward the out-coupling diffractive optic ODO. Only a portion of the image-bearing light WG is diffracted by each of multiple encounters with intermediate turning grating TG thereby laterally expanding each of the angularly related beams of the image-bearing light WG approaching the out-coupling diffractive optic ODO. The turning grating TG redirects the image-bearing light WG toward the out-coupling diffractive optic ODO for longitudinally expanding the angularly related beams of the image-bearing light WG in a second dimension before exiting the planar waveguide 22 as the image-bearing light WO. Grating vectors, such as the depicted grating vectors k0, k1, k2, extend in a direction that is normal to the diffractive features (e.g., grooves, lines, or rulings) of the diffractive optics and have a magnitude inverse to the period or pitch d (i.e., the on-center distance between grooves) of the diffractive optics IDO, TG, ODO. The in-coupling diffractive optic IDO, the turning grating TG, and the out-coupling diffractive optic ODO may each have a different period or pitch d.

As illustrated in FIG. 2, the in-coupling diffractive optic IDO receives the incoming image-bearing light WI containing a set of angularly related beams corresponding to individual pixels or equivalent locations within an image generated by an image source 16. The image source 16, operable to generate a full range of angularly encoded beams for producing a virtual image, may be, but is not limited to, a real display together with focusing optics, a beam scanner for more directly setting the angles of the beams, or a combination such as a one-dimensional real display used with a scanner. The image light guide 20 outputs an expanded set of angularly related beams in two dimensions of the image by providing multiple encounters of the image-bearing light WG with both the intermediate turning grating TG and the out-coupling diffractive optic ODO in different orientations. In the original orientation of the planar waveguide 22, the intermediate grating TG provides beam expansion in the y-axis direction, and the out-coupling diffractive optic ODO provides a similar beam expansion in the x-axis direction. The reflectivity characteristics and respective periods d of the diffractive optics IDO, ODO, TG, together with the orientations of their respective grating vectors, provide for beam expansion in two dimensions while preserving the intended relationships among the angularly related beams of the image-bearing light WI that are output from the image light guide 20 as the image-bearing light WO.

While the image-bearing light WI input into the image light guide 20 is encoded into a different set of angularly related beams by the in-coupling diffractive optic IDO, the information required to reconstruct the image is preserved by accounting for the systematic effects of the in-coupling diffractive optic IDO. The turning grating TG, located in an intermediate position between the in-coupling and out-coupling diffractive optics IDO, ODO, is typically arranged so that it does not induce any significant change on the encoding of the image-bearing light WG. The out-coupling diffractive optic ODO is typically arranged in a symmetric fashion with respect to the in-coupling diffractive optic IDO, e.g., including diffractive features sharing the same period. Similarly, the period of the turning grating TG also typically matches the common period of the in-coupling and out-coupling diffractive optics IDO, ODO. As illustrated in FIG. 2, the grating vector k1 of the turning grating TG may be oriented at 45 degrees with respect to the other grating vectors k0, k2 (all as undirected line segments). However, in an embodiment, the grating vector k1 of the turning grating TG is oriented at 60 degrees to the grating vectors k0, k2 of the in-coupling and out-coupling diffractive optics IDO, ODO in such a way that the image-bearing light WG is turned 120 degrees. By orienting the grating vector k1 of the intermediate turning grating TG at 60 degrees with respect to the grating vectors k0, k2 of the in-coupling and out-coupling diffractive optics IDO, ODO, the grating vectors k0, k2 are also oriented at 60 degrees with respect to each other (again considered as undirected line segments). Basing the grating vector magnitudes on the common pitch of the turning grating TG and the in-coupling and out-coupling diffractive optics IDO, ODO, the three grating vectors k0, k1, k2 (as directed line segments) form an equilateral triangle, and sum to a zero-vector magnitude, which avoids asymmetric effects that could introduce unwanted aberrations including chromatic dispersion.

The image-bearing light WI that is diffracted into the planar waveguide 22 is effectively encoded by the in-coupling diffractive optic IDO, whether the in-coupling diffractive optic IDO uses gratings, holograms, prisms, mirrors, or some other mechanism. Any reflection, refraction, and/or diffraction of light that takes place at the in-coupling diffractive optic IDO must be correspondingly decoded by the out-coupling diffractive optic ODO to re-form the virtual image that is presented to the viewer. The turning grating TG, placed at an intermediate position between the in-coupling and out-coupling diffractive optics IDO, ODO, is typically designed and oriented so that it does not induce any change on the encoded light. The out-coupling diffractive optic ODO decodes the image-bearing light WG into its original or desired form of angularly related beams that have been expanded to fill the eyebox 74.

Whether any symmetries are maintained or not among the turning grating TG and the in-coupling and out-coupling diffractive optics IDO, ODO or whether any change to the encoding of the angularly related beams of the image-bearing light WI takes place along the planar waveguide 22, the turning grating TG and the in-coupling and out-coupling diffractive optics IDO, ODO are related so that the image-bearing light WO that is output from the planar waveguide 22 preserves or otherwise maintains the original or desired form of the image-bearing light WI for producing the intended virtual image.

The letter "R" represents the orientation of the virtual image that is visible to the viewer whose eye is in the eyebox 74. As shown, the orientation of the letter "R" in the represented virtual image matches the orientation of the letter "R" as encoded by the image-bearing light WI. A change in the rotation about the z axis or angular orientation of incoming image-bearing light WI with respect to the x-y plane causes a corresponding symmetric change in rotation or angular orientation of outgoing light from out-coupling diffractive optic ODO. From the aspect of image orientation, the turning grating TG simply acts as a type of optical relay, providing expansion of the angularly encoded beams of the image-bearing light WG along one axis (e.g., along the y-axis) of the image. The out-coupling diffractive optic ODO further expands the angularly encoded beams of the image-bearing light WG along another axis (e.g., along the x-axis) of the image while maintaining the original orientation of the virtual image encoded by the image-bearing light WI. As illustrated in FIG. 2, the turning grating TG may be a slanted or square grating arranged on the front or back surfaces of the planar waveguide 22. Alternately, the turning grating TG may be a blazed grating.

In diffractive optics formed as diffraction gratings, increasing grating depth results in improved diffraction efficiency. However, increased diffraction efficiency in out-coupling diffraction gratings may reduce image-bearing light WO output from outer areas of the diffraction grating because too much image-bearing light WG is output from the center of the out-coupling diffractive optic, creating a visual hotspot. The presently disclosed embodiments of an image light guide utilize a zoned out-coupling diffractive optic to facilitate a more even distribution of out-coupled image-bearing light WO at an increased diffraction efficiency.

Figure 3A:
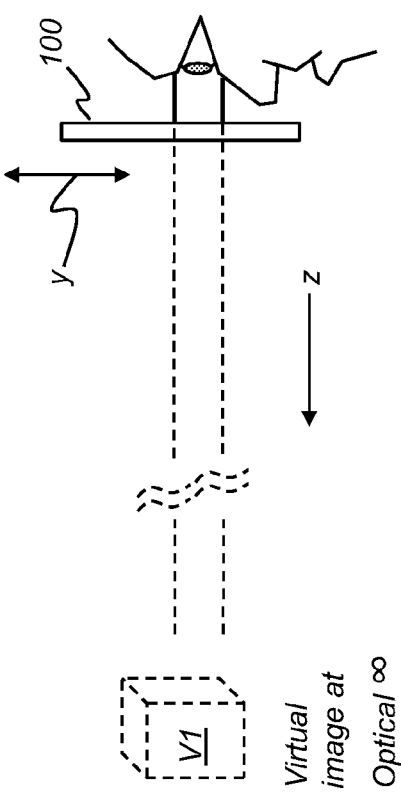
FIGS. 3A, 3B, and 3C are side, top, and perspective views, respectively, of an imaging apparatus with an image light guide for forming a virtual image at infinity focus.
Figure 3B:
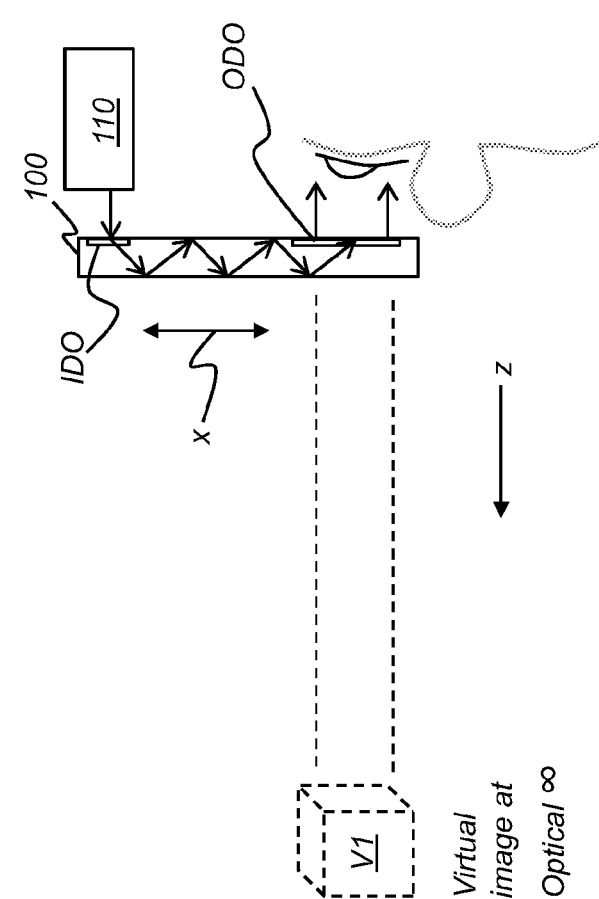
Figure 3C:
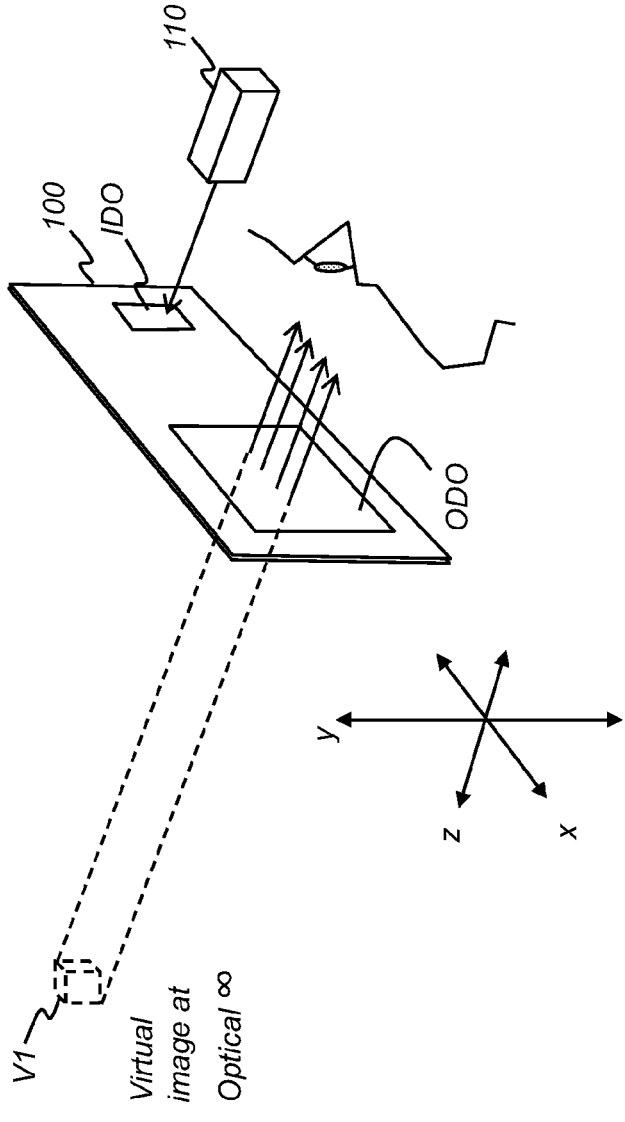

In an embodiment, as illustrated in FIGS. 3A, 3B, and 3C, an image light guide 100 is operable to convey virtual images to expanded eyeboxes and present the virtual images at an optical infinity focus. That is, each of the angularly related beams that comprise the image-bearing light within the eyebox remains in a substantially collimated form. Image content is produced by a projector 110 and conveyed by the image light guide 100 through the in-coupling and out-coupling diffractive optics IDO, ODO appears to a viewer's eye as a virtual image V1 located well in front of the image light guide 100 at an infinity focus. The apparent size of the virtual image within the viewer's field of view relates to the ranges of angles through which the angularly related beams encode the image. The solid lines exiting the out-coupling diffractive optic ODO represent one of the collimated beams of the image-bearing light WO, and the dashed lines represent a virtual extension of the one collimated beam in front of the image light guide 100 corresponding to a pixel of the virtual image that appears to emanate from a source located at infinity.

Figures 4A, 4B, 4C:
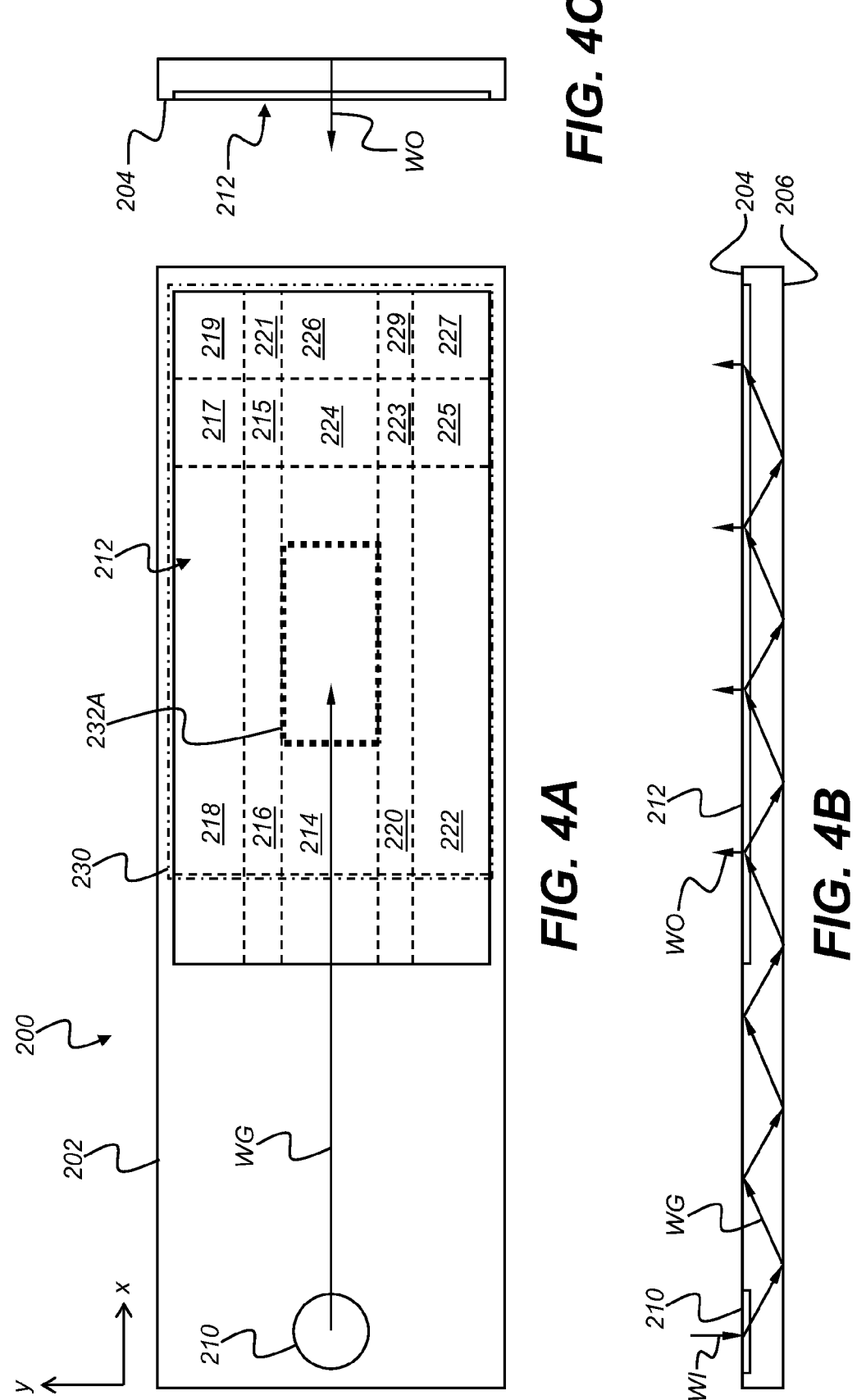
FIGS. 4A, 4B, and 4C are top, side, and end views, respectively, of an image light guide having a zoned out-coupling diffractive optic according to an exemplary embodiment of the presently disclosed subject matter.

As illustrated in FIGS. 4A-4C, in an embodiment, an image light guide 200 includes a waveguide 202 having front and back parallel surfaces 204, 206. An in-coupling diffractive optic 210 and an out-coupling diffractive optic 212 are located on the waveguide front surface 204. In an embodiment, the in-coupling optic 210 and the out-coupling diffractive optic 212 are located on the waveguide back surface 206. In another embodiment, the in-coupling optic 210 is located on the waveguide front surface 204 and the out-coupling diffractive optic 212 is located on the waveguide back surface 206.

In an embodiment, an intermediate diffractive optic is located optically between the in-coupling diffractive optic 210 and the out-coupling diffractive optic 212. The intermediate diffractive optic may be a turning grating, and/or the intermediate diffractive optic may enable increased design variance.

The out-coupling diffractive optic 212 comprises a compound diffraction grating pattern operable to expand and out-couple image-bearing light WG as image-bearing light WO. A compound diffraction grating pattern includes two or more overlapping diffractive patterns, where each diffractive pattern is demarcated by a grating vector k. In an embodiment, the compound diffraction grating pattern includes a non-overlapping sinusoidal diffractive pattern having three or more vector k components. As illustrated in FIG. 4A, in an embodiment, the out-coupling diffractive optic 212 includes two or more zones 214, 215, 216, 217, 218, 219, 220, 221, 222, 223, 224, 225, 226, 227, 229 of diffractive features, wherein the diffractive features of each zone 214, 215, 216, 217, 218, 219, 220, 221, 222, 223, 224, 225, 226, 227, 229 are different from the diffractive features in an adjacent zone 214, 215, 216, 217, 218, 219, 220, 221, 222, 223, 224, 225, 226, 227, 229. As illustrated in FIGS. 4A-6C, in an embodiment, the out-coupling diffractive optic 212 includes a first zone 214 generally centrally located in the y-axis direction. A second zone 216 is generally located above and adjacent to the first zone 212 in the y-axis direction. A third zone 218 is generally located above and adjacent to the second zone 216. A fourth zone 220 is generally located below and adjacent to the first zone 212 in the y-axis direction. A fifth zone 222 is generally located below and adjacent to the fourth zone 220 in the y-axis direction. A sixth zone 224 is generally centrally located in the y-axis direction and generally located adjacent to the right of the first zone 214 in the x-axis direction. A seventh zone 226 is generally located adjacent to the right of the sixth zone 224 along the x-axis direction.

The out-coupling diffractive optic 212 defines an output aperture 230. Portions of the out-coupling diffractive optic 212 positioned outside of the output aperture 230 sometimes redirect image-bearing light into the output aperture 230 and may be shaped like a wedge or a triangle. The output aperture 230 is shown by a dotted line located outside of the out-coupling diffractive optic 212; however, persons skilled in the art will appreciate that the figures are presented in this way for clarity and that the output aperture 230 does not extend outside of the out-coupling diffractive optic 212.

With continued reference to FIG. 4A, an eyebox 232A (i.e., head motion box) is shown over the first zone 214 of the out-coupling diffractive optic 212 for visualization purposes. The eyebox 232A corresponds to an incoming ray of image-bearing light of the center of the field of view (FOV) for a virtual image. A viewer's eye is positioned at some distance, which may be referred to as eye relief, from the waveguide 202. In operation, the viewer's eye can move within the eyebox 232A and still see the pixel corresponding to the incoming rays.

The in-coupling diffractive optic 210 is operable to in-couple an incoming ray of the image-bearing light WI at a TIR condition whereby the image-bearing light WG propagates towards the out-coupling diffractive optic 212 where the image-bearing light WO can out-couple towards the eyebox 232A. As illustrated in FIG. 4A-4C, in an embodiment, the ray corresponding to the center of the field of view (FOV) for a virtual image is in-coupled into the waveguide 202 via the in-coupling diffractive optic 210. The ray is shown incident on the in-coupling diffractive optic 210 normal to waveguide 202; however, an input central ray may be incident to the in-coupling diffractive optic 210 at an angle other than perpendicular to the waveguide 202. In the embodiment illustrated in FIGS. 4A-4C, the first zone 214 of the out-coupling diffractive optic 212 is operable to expand the image-bearing light WG in one or more dimensions (i.e., x- and y-axis directions) and out-couple the image-bearing light WO in the eyebox 232A.

From the perspective of this field angle, the ideal out-coupling grating in this area under the eyebox 232A would have linear gratings, positioned parallel to the linear gratings of the in-coupling grating, with only one function—to out-couple the image-bearing light WG. However, to facilitate expansion of the image-bearing light to create a larger eyebox, the out-coupling grating of the first zone 214 comprises generally diamond-shaped posts which implicitly define a grating vector k3 parallel with the grating vector k0 of the in-coupling diffractive optic 210. In other words, in the first zone 214 vertical linear grating features are almost completely de-rated such that the only evidence of the vertical linear grating features are the points of the generally diamond-shaped posts. The generally diamond-shaped posts are offset row-to-row, but still make a vertical line. The diffraction of the image-bearing light WO in the eyebox 232A is produced by the periodicity of the diffractive features.

Figures 5A, 5B, 5C:
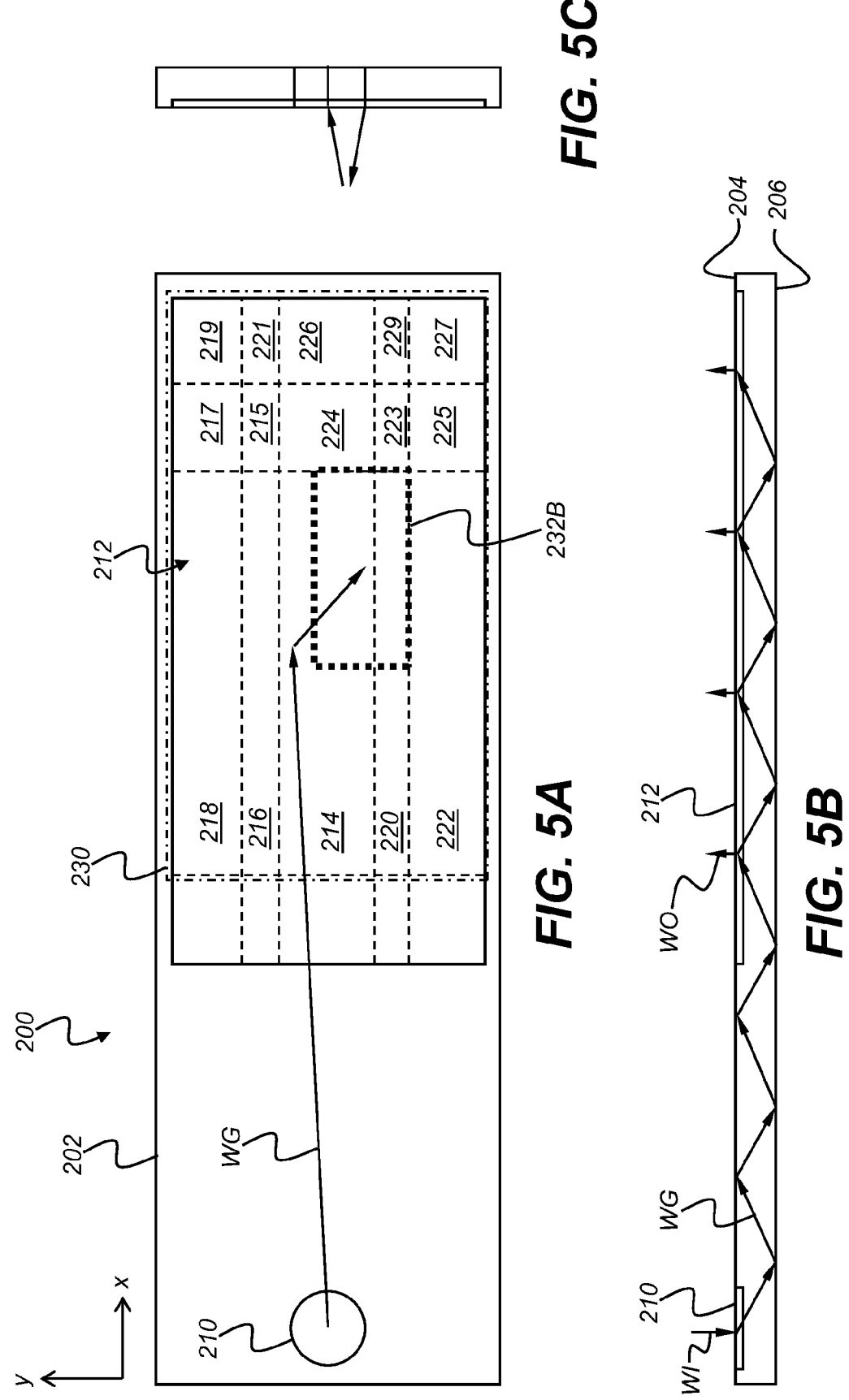
FIGS. 5A, 5B, 5C are top, side, and end views, respectively, of the image light guide having a zoned out-coupling diffractive optic according to FIG. 4A.

As illustrated in FIGS. 5A-5C, where a ray of image-bearing light WG corresponds to a portion of a virtual image that is down and to the right of center of the virtual image, the projection of the eyebox 232B is correspondingly moved. If the image-bearing light WG was not redirected (i.e., turned) at the out-coupling diffractive optic 212, the out-coupled image-bearing light WO would miss the projection of the eyebox 232B entirely. Here the different zones all outcouple the image-bearing light WO from a single pixel, or field angle, into the same angular range, forming a virtual image. In other words, image-bearing light from a single virtual pixel is output into the same angle by neighboring zones. For example, as illustrated in FIG. 5A, image-bearing light WG for the virtual pixel corresponding to the eyebox 232B is out-coupled at the same angle or angular range in both the first zone 214 and the fourth zone 220.

Figure 6A:
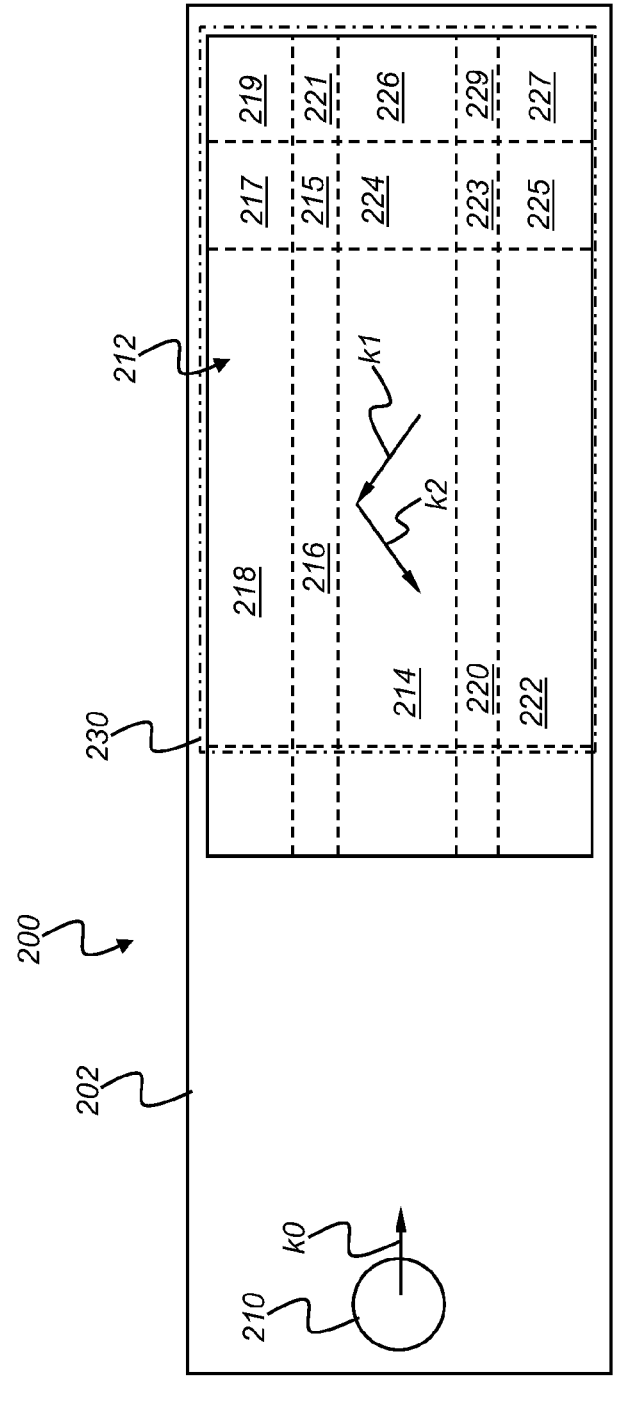
FIGS. 6A, 6B show grating vector diagrams according to an exemplary embodiment of the presently disclosed subject matter.
Figure 6B:
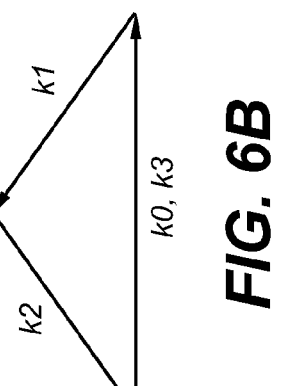

In an embodiment, the first zone 214 includes diffractive features operable to diffract (i.e., turn) the ray of image-bearing light WG downward at an angle relative to the direction of travel of the image-bearing light WG in the area of the turn. The diffractive features of the first zone 214 are also operable to out-couple the turned image-bearing light WG as image-bearing light WO. As illustrated in FIGS. 6A and 6B, the diffractive features of the first zone 214 define two grating vectors k1, k2 that combine with the grating vector k0 of the in-coupling diffractive optic 210 to form a vector diagram describing a closed triangle and having substantially zero magnitude. In other words, a combination of grating vectors k0, k1, k2 forms a vector having substantially no magnitude. In an embodiment, the grating vectors k0, k1, k2 form a closed isosceles triangle. In another embodiment, grating vectors k0, k1, k2 form a closed scalene triangle. In this way, there would be no dispersion or angular error induced in the virtual image by the diffractive features of the first zone 214. The first zone 214 also implicitly defines a fourth grating vector k3, via the arrangement of the diffractive features thereof, that is equivalent to the grating vector k0 of the in-coupling diffractive optic 210. In this embodiment, these grating vectors k0, k1, k2, k3 are all necessary in the first diffraction zone 214.

Figures 7A, 7B, 7C:
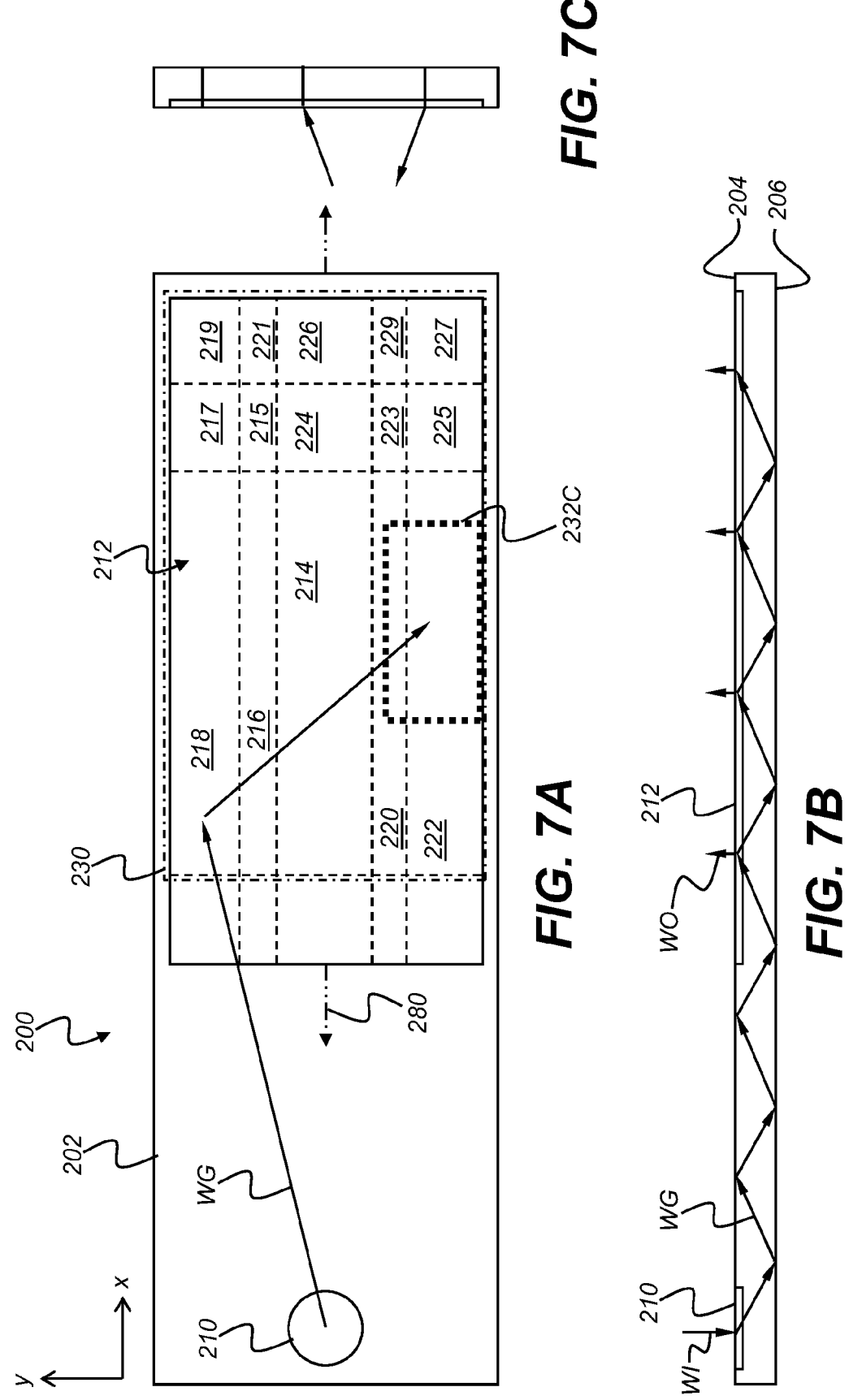
FIGS. 7A, 7B, 7C are top, side, and end views, respectively, of the image light guide having a zoned out-coupling diffractive optic according to FIG. 4A.

As illustrated in FIGS. 7A-7C, where a ray of image-bearing light WG corresponds to a portion of a virtual image that is further down and to the right of center of the virtual image, the projection of the eyebox 232C is correspondingly moved. Where this ray of image-bearing light WG propagates through the waveguide 202 to an area in the third zone 218, but the ray of image-bearing light WG needs to exit from a portion of the out-coupling diffractive optic 212 in the fourth or fifth zones 220, 222, the third zone 218 is operable to redirect (i.e., turn) the image-bearing light WG downward in the y-axis direction toward the fifth zone 222. Any image-bearing light WG that is directly out-coupled from the third zone 218, i.e., as from a linear diffraction grating, would miss the viewer's eye. In order for the third and fifth zones 218, 222 to redirect or out-couple the image-bearing light WG, only one grating vector is required.

Propagation symmetry dictates that sometimes image-bearing light WG will travel downward in the y-axis direction toward the fifth zone 222 and need to turn upward in the y-axis direction towards the third zone 218 to be out-coupled as image-bearing light WO. The grating features required to redirect image-bearing light WG toward the third zone 218 are identical to the grating features required to out-couple image-bearing light WG redirected from the third zone 218. Therefore, only a single grating vector k5 is necessary in the fifth zone 222.

The second and fourth zones 216, 220 are operable as transition, or intermediate, zones of the out-coupling diffractive optic 212, where the design of the grating features in the second and fourth zones 216, 220 is some combination, or convolution, of the two neighboring zones. For example, the second zone 216 describes a combination of the first and third zones 214, 218. The transition zones 216, 220 make for smoother transitions in the waveguide 202 and produce a more desirable see-through experience of the image light guide 200; for example, a more uniform illumination of the resulting virtual image across the field of view (FOV). In an embodiment, the out-coupling diffractive optic 212 includes multiple transition zones from the center of the out-coupling diffractive optic 212 to the edges thereof in the x- and y-axis directions.

As illustrated in FIGS. 8A-8C, in an embodiment, the depth of the diffractive features in the two or more zones 214, 215, 216, 217, 218, 219, 220, 221, 222, 223, 224, 225, 226, 227, 229 of the out-coupling diffractive optic 212 can vary independently of the zone boundaries 290 (see FIG. 10) which are defined in the underlying configuration of the diffractive features. The underlying configuration of the diffractive features of the out-coupling diffractive optic 212 determines the direction and relative magnitude of diffracted orders, whereas depth modulation of the diffractive features serves to modulate the relative efficiency of all the present diffracted orders. It is possible to apply a gradient depth that is independent of the underlying pattern of the diffractive features of the out-coupling diffractive optic 212.

In an embodiment, the depth of the diffractive features in zones 214, 215, 216, 217, 218, 219, 220, 221, 222, 223, 224, 225, 226, 227, 229 is progressively increased as the diffractive features approach the edge of the out-coupling diffractive optic in the y-axis direction. For example, as illustrated in FIG. 8D, the diffractive features 250 (see FIG. 9) may range progressively in depth $n_1$-$n_3$ from a centerline 280 of the first zone 214 to the outer edge of the first zone 214 in the y-axis direction, the diffractive features 256 (see FIG. 9) may range progressively in depth $n_4$-$n_6$ from the edge of the first zone 214 to the outer edge of the second zone 216 in the y-axis direction, and the diffractive features 252 (see FIG. 9) may range progressively in depth $n_7$-$n_9$ from the edge of the second zone 216 to the outer edge of the third zone 218 in the y-axis direction. This progressive increase in depth of the diffractive features is mirrored across the centerline 280 of the first zone 214. FIG. 8A shows a schematic of a linear grating feature which increases in depth along a y-axis symmetrically across a center-plane 282 parallel with the x-z plane. FIG. 8B shows a schematic of a linear grating feature which increases in depth in a stepped configuration along the y-axis symmetrically across the center-plane 282 parallel with the x-z plane.

In another embodiment, the depth of the diffractive features in zones 214, 215, 216, 217, 218, 219, 220, 221, 222, 223, 224, 225, 226, 227, 229 is progressively increased as the diffractive features approach the edge of the out-coupling diffractive optic in the x-axis direction. FIG. 8C shows a schematic of a linear grating feature which increases in depth along an x-axis symmetrically across a center-plane 284 parallel with the y-z plane. In an embodiment, the depth of the diffractive features in zones 214, 215, 216, 217, 218, 219, 220, 221, 222, 223, 224, 225, 226, 227, 229 is progressively increased as the diffractive features approach the edge of the out-coupling diffractive optic in both the x- and y-axis directions.

Figure 11C:
FIGS. 11A, 11B, 11C, 11D, 11E are schematic diagrams of diffractive features according to an exemplary embodiment of the presently disclosed subject matter.
Figure 11E:
Figure 11B:
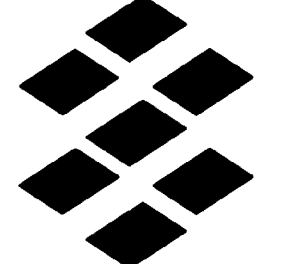
Figure 11D:
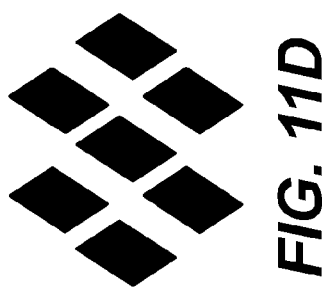
Figure 11A:
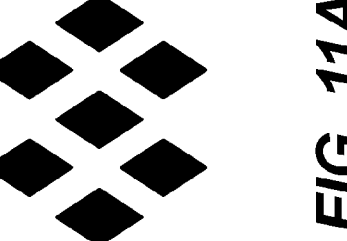

As illustrated in FIG. 9, in an embodiment, the first zone 214 of the out-coupling diffractive optic 212 includes diffractive features 250 describing a compound diffractive pattern. The diffractive features 250 as illustrated in FIG. 9 are generally diamond-shaped posts. A schematic of the diffractive features 250 is shown in FIG. 11A. In another embodiment, the diffractive features 250 are one or more sinusoidal rows or wavy features. The diffractive feature 252, 254 of the third and fifth zones 218, 222, respectively, describe linear gratings. The diffractive features 254 are symmetric with the diffractive features 252 about the centerline 280 of the first zone 214. The diffractive features 252, 254 are also disposed at an angle q relative to the centerline 280. A schematic of the diffractive features 252 is shown in FIG. 11C, and a schematic of the diffractive features 254 is shown in FIG. 11E.

The diffractive features 256 of the second zone 216 describe a combination of the diffractive features 250 and the diffractive features 252. In other words, in an embodiment, the diffractive features 256 are parallelogram-shaped features. A schematic of the diffractive features 256 is shown in FIG. 11B. Similarly, the diffractive features 258 of the fourth zone 220 describe a combination of the diffractive feature 250 and the diffractive features 254 such that the diamond-shaped features approach linear gratings. In other words, in an embodiment, the diffractive features 258 are parallelogram-shaped features. A schematic of the diffractive features 258 is shown in FIG. 11D. The diffractive features 260 of the sixth zone 224 describe generally triangular-shaped features approaching generally linear gratings disposed generally parallel with the y-axis. The diffractive features 262 of the seventh zone 226 describe generally vertical linear gratings located generally parallel with the y-axis.

Figures 12, 13:
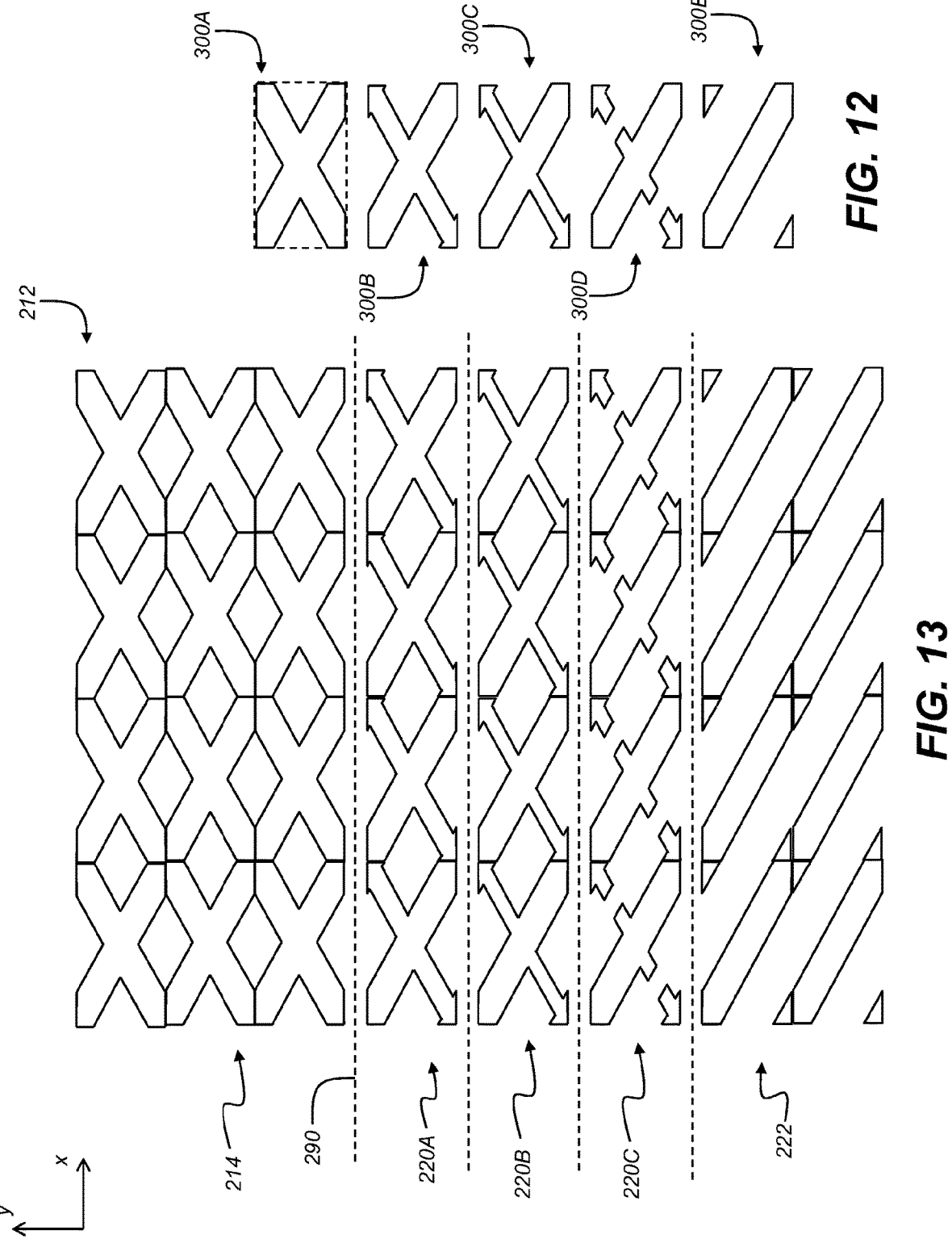
FIG. 12 shows schematics of rectangular unit cells operable to form repeating patterns of diffractive features within an out-coupling diffractive optic according to an exemplary embodiment of the presently disclosed subject matter.
FIG. 13 shows a schematic of a portion of an out-coupling diffractive optic comprising unit cells according to FIG. 12.

FIG. 12 shows a schematic of rectangular unit cells 300A, 300B, 300C, 300D, 300E. In an embodiment, the first zone 214, the fourth zone 220A, 220B, 220C, and the fifth zone 222 of the out-coupling diffractive optic 212 are formed by the arrangement of the unit cells 300A, 300B, 300C, 300D, 300E located in a two-dimensional lattice. In an embodiment, each unit cell 300A, 300B, 300C, 300D, 300E comprises the smallest repeating diffractive feature within a zone. However, unit cell 300A, 300B, 300C, 300D, 300E may be any size such that the unit cell is repeatable within the zone to form the periodic diffractive features thereof. The diffractive features within each zone comprise an arrangement of the unit cells in a periodic grid, forming the two-dimensional periodic lattice structure. The periodic grid is the same for each zone 214, 215, 216, 217, 218, 219, 220, 221, 222, 223, 224, 225, 226, 227, 229 within the out-coupling diffractive optic 212. As shown in FIG. 13, a portion of the compound diffractive pattern of the out-coupling diffractive optic 212 comprises the replication and contiguous arrangement of the unit cells 300A, 300B, 300C, 300D, 300E. Persons skilled in the art will recognize that there may be more unit cells 300A, 300B, 300C, 300D, 300E in the x- and/or y-axis directions of each of the first zone 214, the fourth zone 220A, 220B, 220C, and the fifth zone 222.

In an embodiment, there are multiple zones transitioning from the center of the out-coupling diffractive optic 212 to its edges in the y- and/or x-axis directions. However, in reality only a finite number of nanostructures are permitted in the y- and/or x-axis directions of the out-coupling diffractive optic 212. Therefore, in an embodiment, the number of transition zones from the center of the out-coupling diffractive optic 212 to its edges in the y- and/or x-axis directions is, at least in part, a function of the smallest producible structure and the size of the out-coupling diffractive optic 212.

In another embodiment, the zones 214, 215, 216, 217, 218, 219, 220, 221, 222, 223, 224, 225, 226, 227, 229 of the out-coupling diffractive optic 212 are delineated by gap areas. As illustrated in FIG. 10, the zone boundaries 290 are indicated by dotted lines defining the zones 214, 215, 216, 217, 218, 219, 220, 221, 222, 223, 224, 225, 226, 227, 229. The zone boundaries 290 may define gap areas between the zones 214, 215, 216, 217, 218, 219, 220, 221, 222, 223, 224, 225, 226, 227, 229.

As illustrated in FIG. 10, in an embodiment, the diffractive features 250 of the first zone 214 may comprise only a single row. In this embodiment, the second zone 216 includes subsections 216A, 216B where the diffractive features 256 in zone 216B are closer to linear gratings than the diffractive features 256 in zone 216A. The fourth zone 220 includes subsections 220A, 220B, where the diffractive features 258 in zone 220B are closer to linear gratings than the diffractive features 258 in zone 220A.

Figures 14A, 14B:
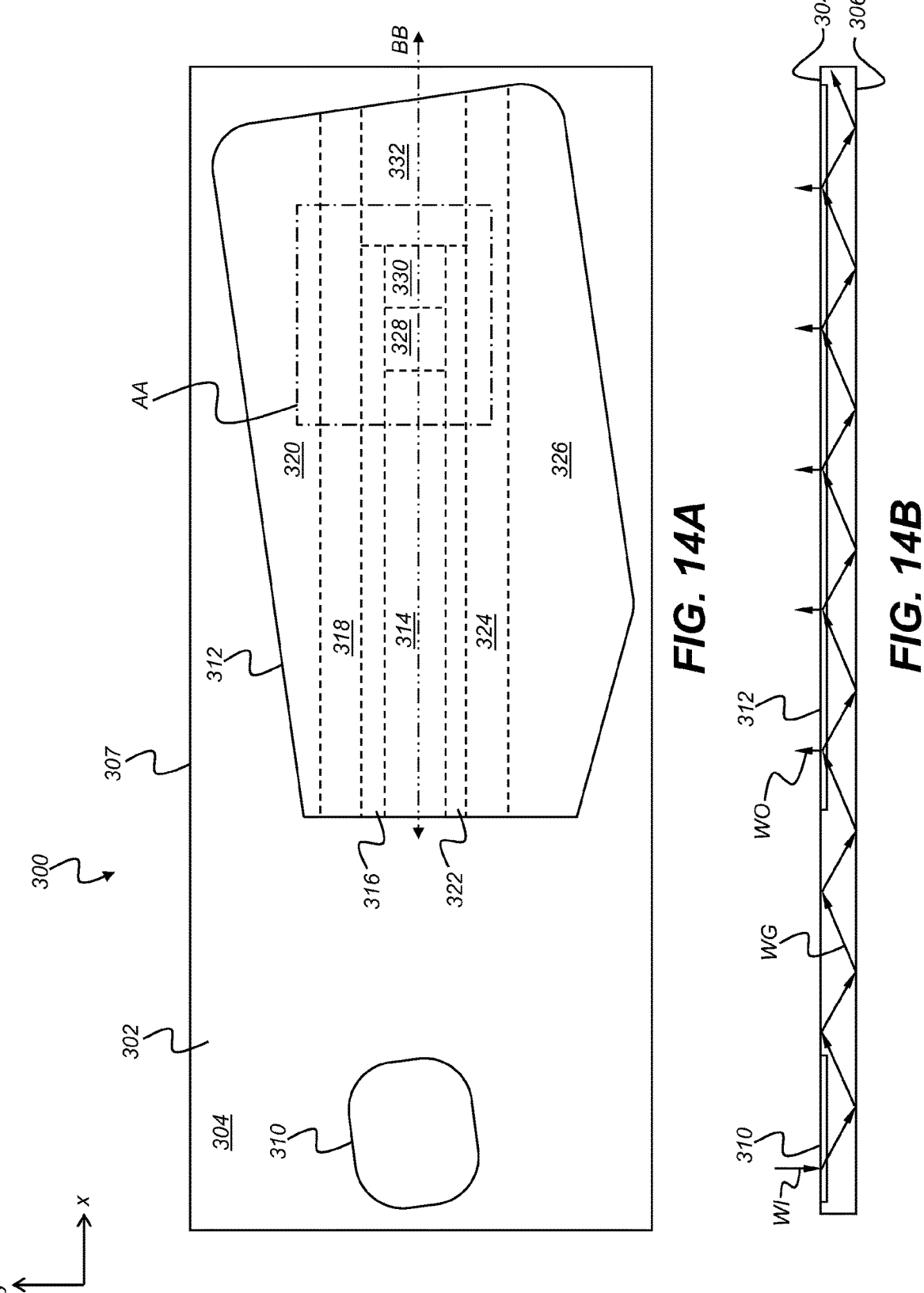
FIGS. 14A and 14B show a schematic top and side view, respectively, of an image light guide having a zoned out-coupling diffractive optic according to an exemplary embodiment of the presently disclosed subject matter.

As illustrated in FIGS. 14A and 14B, in an embodiment, an image light guide 300 includes a waveguide 302 having front and back parallel surfaces 304, 306. An in-coupling diffractive optic 310 and an out-coupling diffractive optic 312 are located on the waveguide front surface 304. The out-coupling diffractive optic 312 comprises a compound diffraction grating pattern operable to expand and out-couple image-bearing light WG as image-bearing light WO. The out-coupling diffractive optic 312 includes ten zones 314, 316, 318, 320, 322, 324, 326, 328, 330, 332 of diffractive features, wherein the diffractive features of each zone 314, 316, 318, 320, 322, 324, 326, 328, 330, 332 are different from the diffractive features in an adjacent zone 314, 316, 318, 320, 322, 324, 326, 328, 330, 332.

Figure 15:
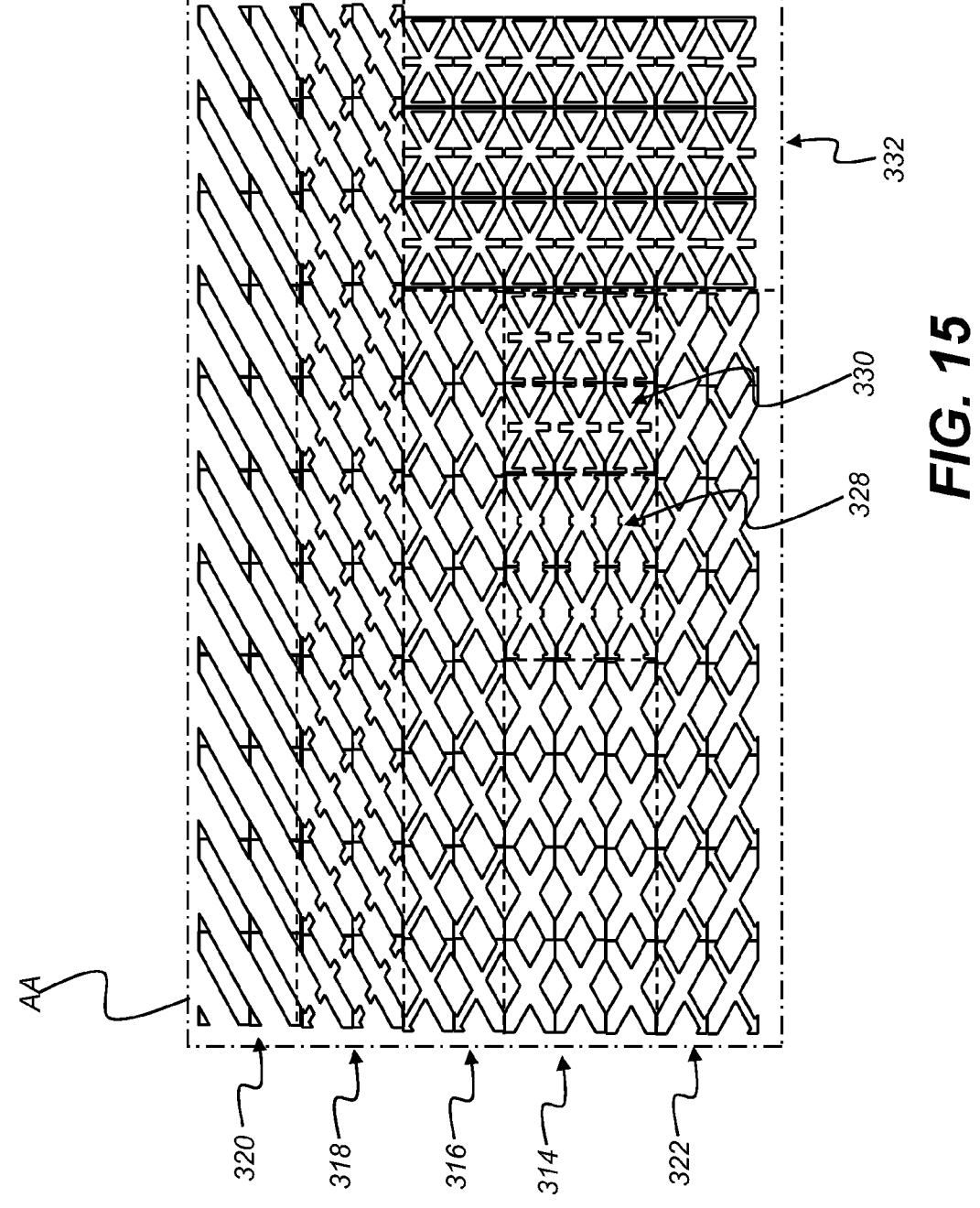
FIG. 15 shows a schematic of a portion of an out-coupling diffractive optic according to FIG. 14.

The out-coupling diffractive optic first zone 314 is generally centrally located in the y-axis direction. A second zone 316 is generally located above and adjacent to the first zone 314 in the y-axis direction. A third zone 318 is generally located above and adjacent to the second zone 316. A fourth zone 320 is generally located above and adjacent to the third zone 318. The second zone 316 and the third zone 318 comprise diffractive optics operable as transition zones between the diffractive features of the first zone 314 and the fourth zone 320. In other words, the second and third zones 316, 318 comprise diffractive features which are a combination, or convolution, of the first zone 314 and the fourth zone 310. As illustrated in FIG. 15, the second zone 316 more closely resembles the first zone 314 and the third zone 318 more closely resembles the fourth zone 320.

A fifth zone 322 is generally located below and adjacent to the first zone 314 in the y-axis direction. A sixth zone 324 is generally located below and adjacent to the fifth zone 322 in the y-axis direction. A seventh zone 326 is generally located below and adjacent to the sixth zone 324 in the y-axis direction. The fifth and sixth zones 322, 324 comprise diffractive optics operable as transition zones between the diffractive features of the first zone 314 and the seventh zone 326. In other words, the fifth and sixth zones 322, 324 comprise diffractive features which are a combination, or convolution, of the first zone 314 and the seventh zone 326. The diffractive features of the fifth, sixth, and seventh zones 322, 324, 326 are symmetric with the diffractive features of the second, third, and fourth zones 316, 318, 320 across a centerline of the first zone 314. However, the shape of the out-coupling diffractive optic 312 is not necessarily symmetric across the centerline of the first zone 314.

An eighth zone 328 is generally centrally located in the y-axis direction and generally located adjacent to the right of the first zone 314 in the x-axis direction. A ninth zone 330 is generally centrally located in the y-axis direction and generally located adjacent to the right of the eighth zone 328 along the x-axis direction. A tenth zone 332 is also generally centrally located in the y-axis direction between the third zone 318 and the sixth zone 324, and generally located adjacent to the right of the ninth zone 330, the second zone 316, and the fifth zone 322 along the x-axis direction. The eighth and ninth zones 328, 330 comprise diffractive features operable as transition zones between the diffractive features of the first zone 314 and the tenth zone 332. In other words, the eighth and ninth zones 328, 330 comprise diffractive features which are a combination, or convolution, of the first zone 314 and the tenth zone 332.

In addition, the first zone 314, the eighth zone 326, and the ninth zone 330 have generally the same width in the y-axis direction. The first zone 314, the second zone 316, and the fifth zone 322 combined have generally the same width in the y-axis direction as the tenth zone 332. In an embodiment, the length of the fourth zone 320, the third zone 318, the sixth zone 324 and the seventh zone 326 in the y-axis direction is not equal.

Figures 16A, 16B:
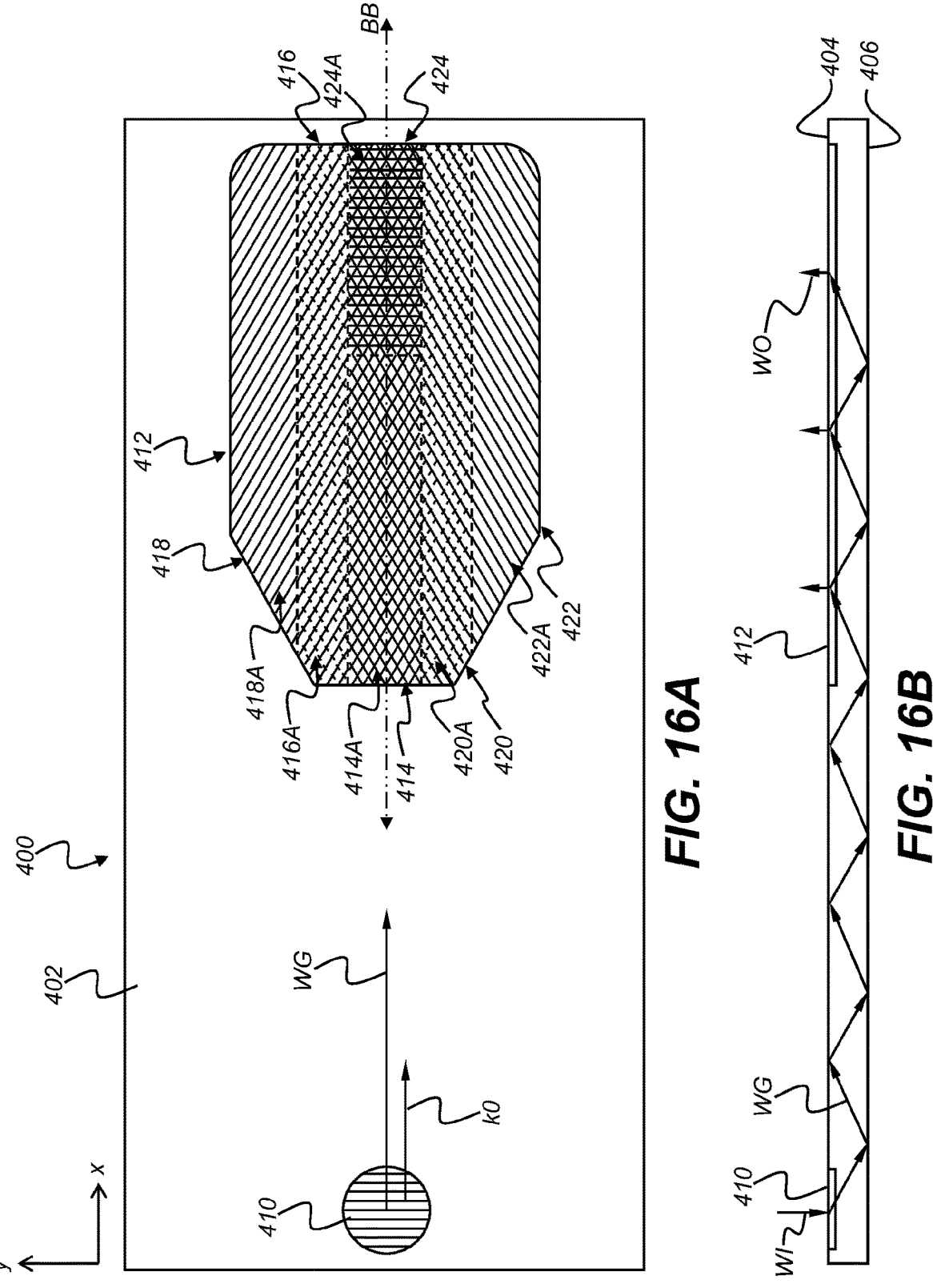
FIGS. 16A and 16B are top and side views, respectively, of an image light guide having a zoned out-coupling diffractive optic according to an exemplary embodiment of the presently disclosed subject matter.

As illustrated in FIGS. 16A-16B, in an embodiment, an image light guide 400 includes a waveguide 402 having front and back parallel surfaces 404, 406. An in-coupling diffractive optic 410 and an out-coupling diffractive optic 412 are located on the waveguide front surface 404. In an embodiment, the in-coupling optic 410 and the out-coupling diffractive optic 412 are located on the waveguide back surface 406. In another embodiment, the in-coupling optic 410 is located on the waveguide front surface 404 and the out-coupling diffractive optic 412 is located on the waveguide back surface 406.

In an embodiment, an intermediate diffractive optic is located optically between the in-coupling diffractive optic 410 and the out-coupling diffractive optic 412. The intermediate diffractive optic may be a turning grating, and/or the intermediate diffractive optic may enable increased design variance.

Figure 17:
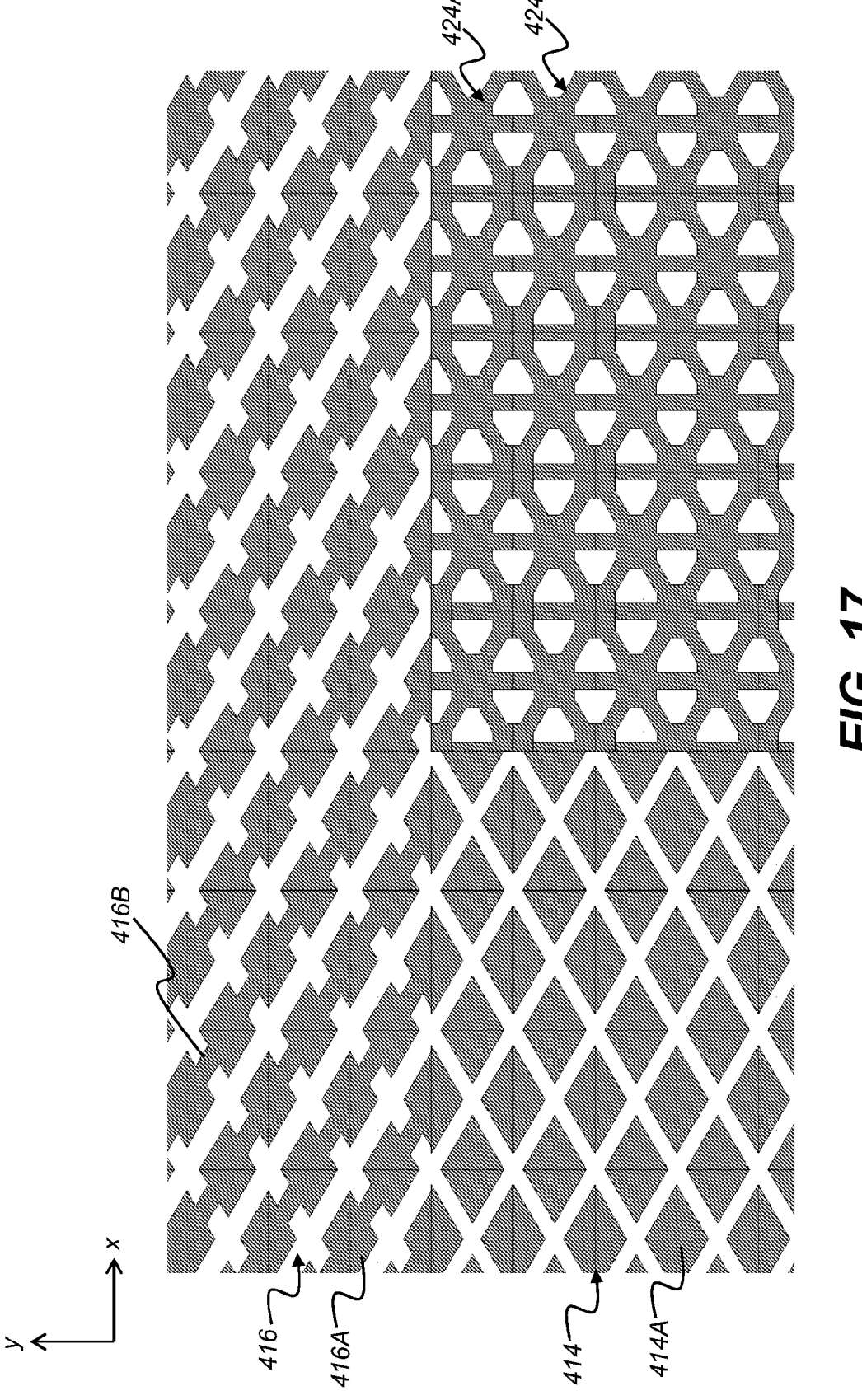
FIG. 17 shows a schematic of a portion of an out-coupling diffractive optic according to FIG. 16A.

The out-coupling diffractive optic 412 comprises a compound diffraction grating pattern operable to expand the image-bearing light WG in two dimensions and out-couple the image-bearing light WG as image-bearing light WO. A compound diffraction grating pattern includes two or more overlapping diffractive patterns, where each diffractive pattern describes a grating vector k. In an embodiment, the compound diffraction grating pattern includes a non-overlapping sinusoidal diffractive pattern describing three or more vector k components. As illustrated in FIGS. 16A and 17, in an embodiment, the out-coupling diffractive optic 412 includes multiple zones 414, 416, 418, 420, 422, 424 of diffractive features, wherein the diffractive features of each zone 414, 416, 418, 420, 422, 424 are different from the diffractive features in an adjacent zone 414, 416, 418, 420, 422, 424. As illustrated in FIG. 16A, in an embodiment, the out-coupling diffractive optic 412 includes a first zone 414 generally centrally located in the y-axis direction. A second zone 416 is generally located above and adjacent to the first zone 414 in the y-axis direction. A third zone 418 is generally located above and adjacent to the second zone 416. A fourth zone 420 is generally located below and adjacent to the first zone 414 in the y-axis direction. A fifth zone 422 is generally located below and adjacent to the fourth zone 420 in the y-axis direction. A sixth zone 424 is generally centrally located in the y-axis direction and generally located adjacent to the right of the first zone 414 in the x-axis direction.

The in-coupling diffractive optic 410 is operable to in-couple an incoming ray of the image-bearing light WI at a TIR condition whereby the image-bearing light WG propagates towards the out-coupling diffractive optic 412 where the image-bearing light WO can out-couple towards an eyebox. In an embodiment, the ray corresponding to the center of the field of view (FOV) for a virtual image is in-coupled into the waveguide 402 via the in-coupling diffractive optic 410. The ray is shown incident on the in-coupling diffractive optic 410 normal to waveguide 402; however, an input central ray may be incident to the in-coupling diffractive optic 410 at an angle other than perpendicular to the waveguide 402. In the embodiment illustrated in FIGS. 16A-16B, the first zone 414 of the out-coupling diffractive optic 412 is operable to expand the image-bearing light WG in one or more dimensions (i.e., x- and y-axis) and out-couple the image-bearing light WO in the eyebox.

To facilitate expansion of the image-bearing light to create a larger eyebox, the out-coupling grating of the first zone 414 comprises generally diamond-shaped posts 414A which define grating vectors k1, k2 and implicitly define a grating vector k3 parallel with the grating vector k0 of the in-coupling diffractive optic 410. In other words, in the first zone 414 vertical linear grating features are almost completely de-rated such that the only evidence of the vertical linear grating features are the points of the generally diamond-shaped posts 414A. The generally diamond-shaped posts 414A are offset row-to-row, but still make a vertical line. In the second zone 416, generally diamond-shaped posts 416A are reduced in size relative to the posts 414A in the first zone 414. The generally diamond-shaped posts 416A in the second zone 416 are connected by linear diffractive features 416B which are angled relative to the grating vector k0 (see FIG. 17). In the third zone 418, the periodic diffractive features comprise linear grating features 418A. The linear diffractive features 418A are positioned generally parallel with the linear diffractive features 416B. The sixth zone 424 includes periodic diffractive features 424A generally comprising three sets of periodic linear features, wherein the first and second sets of linear features are crossed relative to one another and the third set of linear features is arranged vertically through the intersections of the first and second sets of linear features. In an embodiment, the out-coupling diffractive optic 412 is symmetric about longitudinal axis BB such that the fourth zone 420 mirrors the second zone 416 and the fifth zone 422 mirrors the third zone 418.

Figure 18:
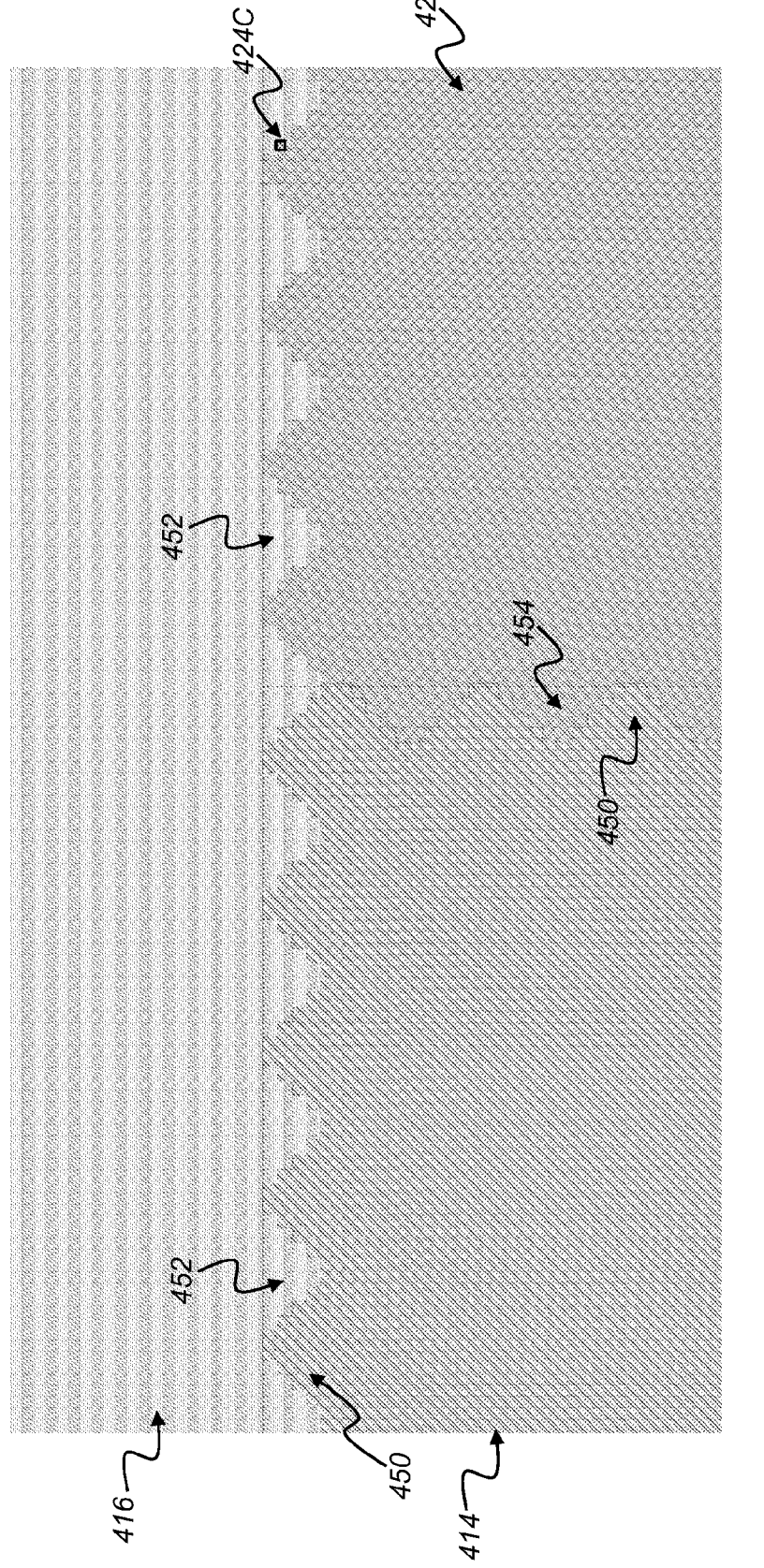
FIG. 18 shows a schematic of a portion of three zone interfaces of an out-coupling diffractive optic according to an exemplary embodiment of the presently disclosed subject matter.

In an embodiment, as illustrated in FIG. 18, the diffractive features of the zones 414, 416, 418, 420, 422, 424 are blended in interface regions. In other words, portions of one zone 414, 416, 418, 420, 422, 424 contain the same grating features as the adjacent zones 414, 416, 418, 420, 422, 424 at the interface regions therebetween. For example, generally triangular portions 450 of the first zone 414 extend into the second zone 416, and generally triangular portions 452 of the second zone 416 extend into the first zone 414 in an alternating pattern in a first interface region. Similarly, generally triangular portions 450 of the first zone 414 extend into the sixth zone 424, and generally triangular portions 454 of the sixth zone 424 extend into the first zone 414 in an alternating pattern in a second interface region. In an embodiment, the generally triangular portions 450, 452, 454 may be 400 um tall and 800 um wide.

In an embodiment, the diffractive features within each zone 414, 416, 418, 420, 422, 424 comprise an arrangement of unit cells 414C, 416C, 418C, 420C, 422C, 424C in a periodic grid, forming the two-dimensional periodic lattice structure of the out-coupling diffractive optic 412. In an embodiment, each unit cell 414C, 416C, 418C, 420C, 422C, 424C comprises the smallest repeating diffractive feature within the zone. However, unit cells 414C, 416C, 418C, 420C, 422C, 424C may be any size such that the unit cell is repeatable within the zone to form the periodic diffractive features thereof. The diffractive features within each zone comprise an arrangement of the unit cells in a periodic grid, forming the two-dimensional periodic lattice structure. Each triangular portion 450, 452, 454 of adjacent zones 414, 416, 418, 420, 422, 424 may comprise a plurality of unit cells. The unit cell 424C of the sixth zone 424 shown in FIG. 18 for reference purposes only, and is not shown to scale.

Figure 19:
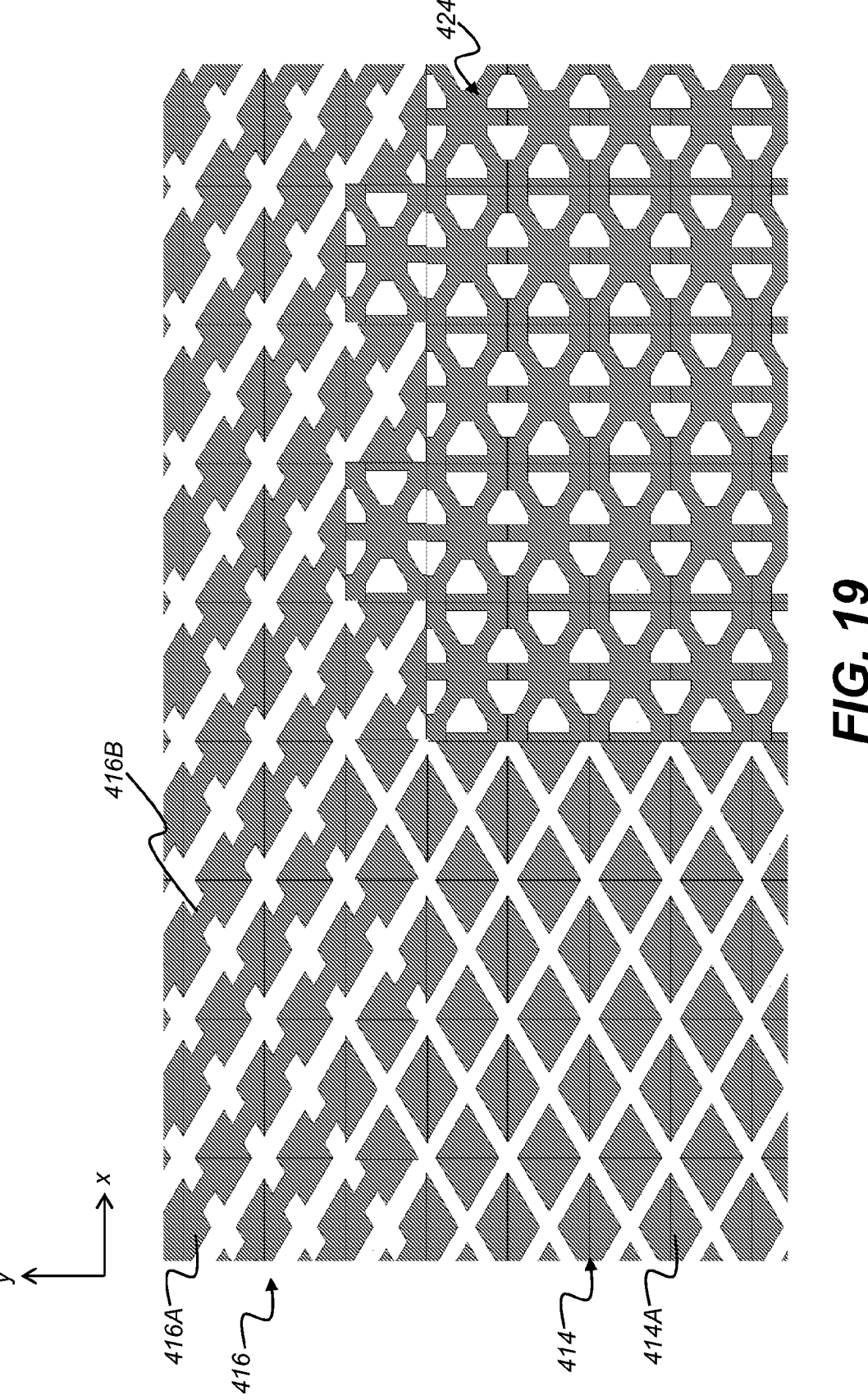
FIG. 19 shows a schematic of a portion of three zone interfaces of an out-coupling diffractive optic according to an exemplary embodiment of the presently disclosed subject matter.

In another embodiment, as illustrated in FIG. 19, the blended interface between adjacent zones 414, 416, 418, 420, 422, 424 may comprise only one unit cell 414C, 416C, 418C, 420C, 422C, 424C from adjacent zones 414, 416, 418, 420, 422, 424 extending into each adjacent zone 414, 416, 418, 420, 422, 424 in an alternating pattern.

Figure 20:
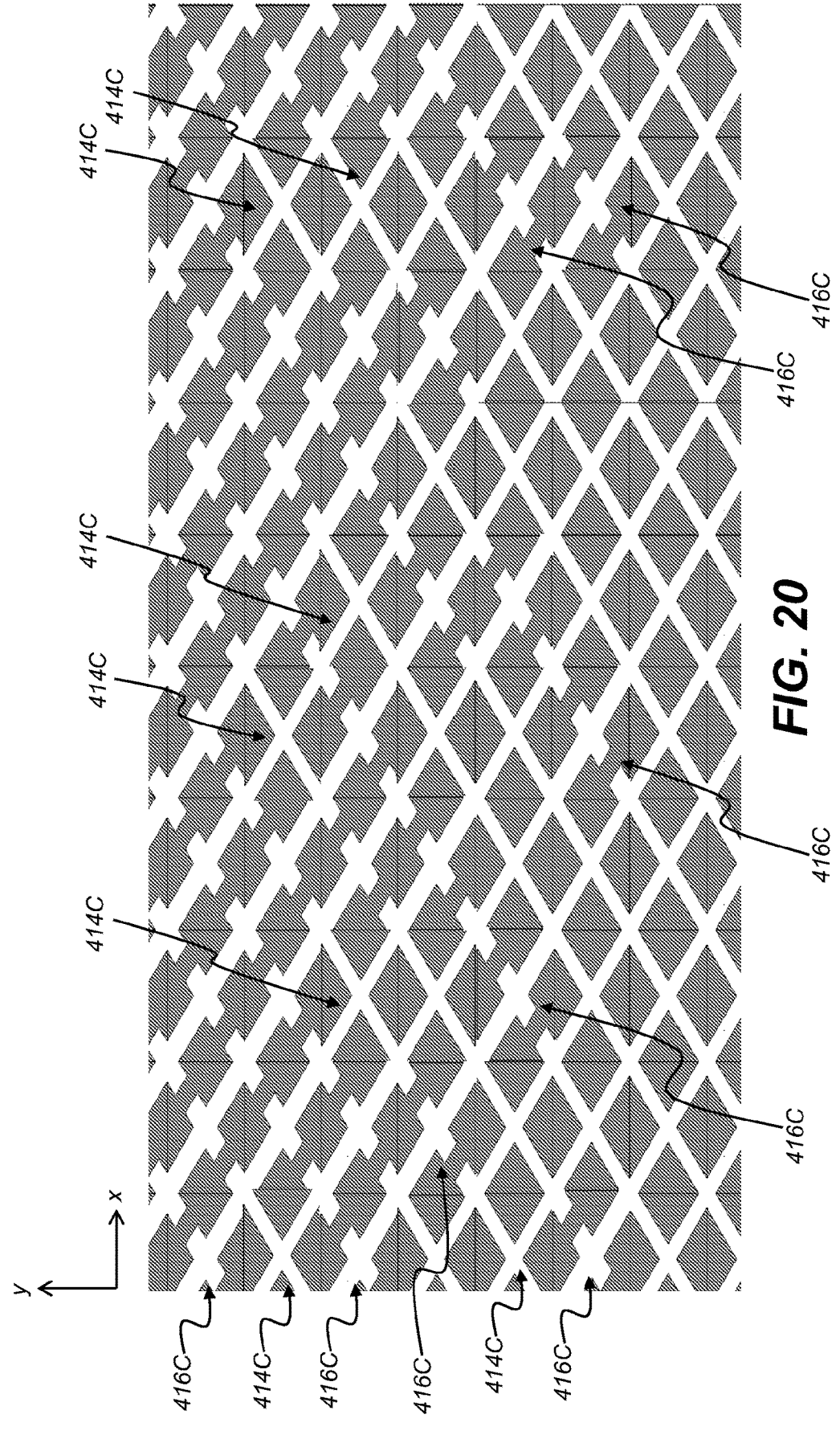
FIG. 20 shows a schematic of a portion of a zone interface of an out-coupling diffractive optic according to an exemplary embodiment of the presently disclosed subject matter.

As illustrated in FIG. 20, in an embodiment, a zone interface between the first and second zones 414, 416 comprises a plurality of unit cells 414C, 416C blended in a pseudo-random arrangement. In an embodiment, the diffractive pattern described by the unit cells within a zone 214, 215, 216, 217, 218, 219, 220, 221, 222, 223, 224, 225, 226, 227, 229 of the out-coupling diffractive optic 212 may comprise a non-overlapping sinusoidal diffractive pattern describing three or more grating vector k components and/or posts.

Figure 21:
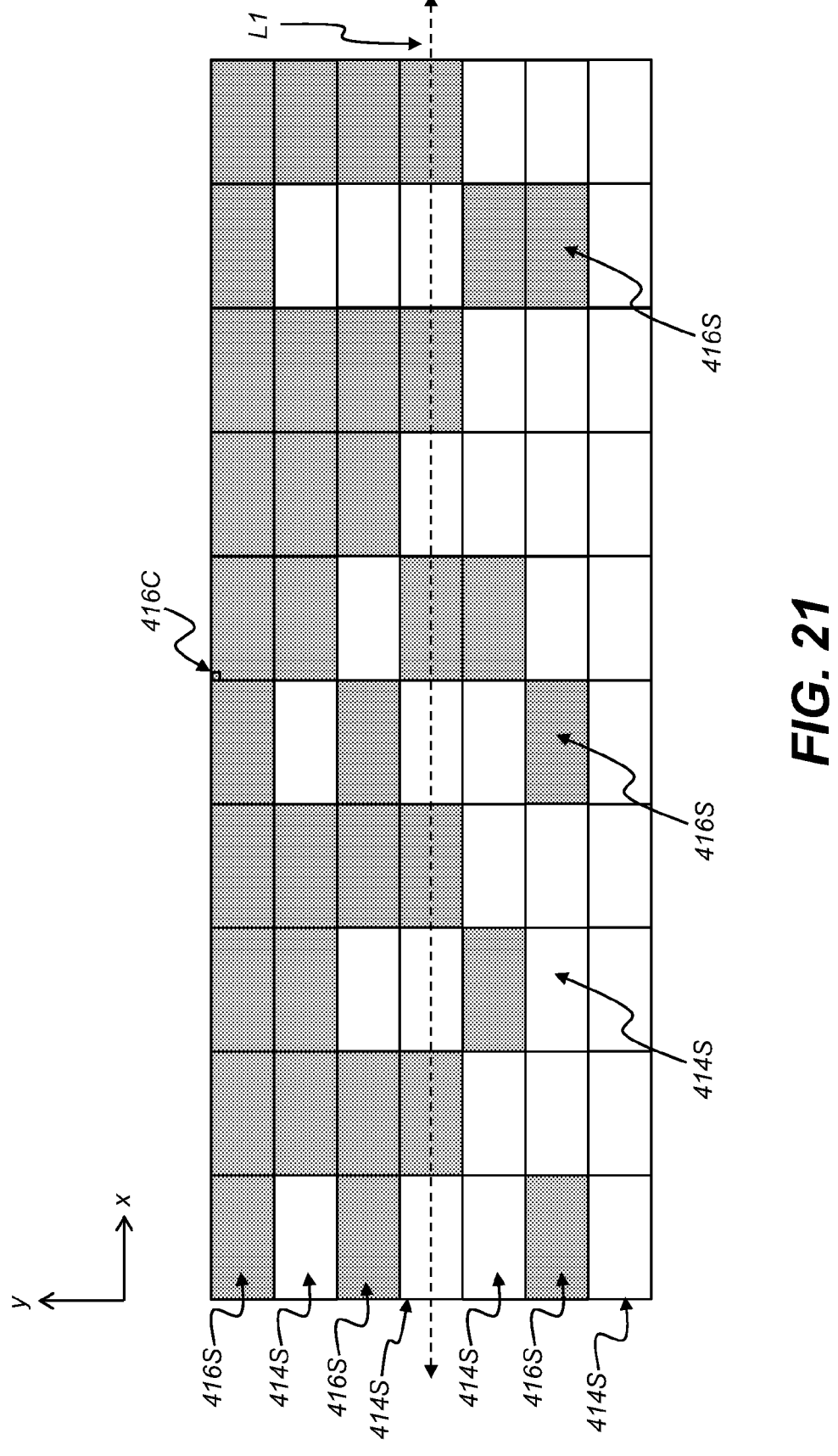
FIG. 21 shows a schematic of a portion of a zone interface of an out-coupling diffractive optic according to an exemplary embodiment of the presently disclosed subject matter.

Referring now to FIG. 21, in another embodiment, an interface between the first and second zones 414, 416 comprises sub-regions 414S, 416S blended in a pseudo-random arrangement. Each sub-region 414S comprises one or more unit cells 414C and each sub-region 416S comprises one or more unit cells 416C. In an embodiment, each sub-region 414S, 416S includes the same number of unit cells. In another embodiment, sub-regions 414S, 416S may include a different number of unit cells. The unit cell 416C shown in FIG. 21 is not shown to scale, and is for reference purposes only. For example, the interface region between adjacent zones 414, 416, 418, 420, 422, 424 may be less than 1 mm wide, the sub-regions 414S, 416S, 418S, 420S, 42S2, 424S may be less than 0.15 mm wide, and the unit cells 414C, 416C, 418C, 420C, 422C, 424C may be 1 um wide.

As illustrated in FIG. 21, in an embodiment, the interface region between the first and second zones 414, 416 is divisible into a grid of sub-regions 414S, 416S. Persons skilled in the art will recognize that the grid shown and described is for illustrative purposes only, and is not a physical feature of the image light guide 400. In an embodiment, at the centerline of the interface region along the longitudinal axis L1, the sub-regions 414S, 416S of the center row of the interface region alternate every other subregion in the x-axis direction. In the row of sub-regions 414S, 416S below the center row in the y-axis direction (i.e., adjacent to the center row on the side of the first zone 414), every third sub-region is a sub-region 416S. In the row of sub-regions 414S, 416S two below the center row in the y-axis direction, every fourth sub-region is a sub-region 416S. In the row of sub-regions 414S, 416S three below the center row in the y-axis direction, all sub-regions are sub-regions 414S. A total area of the sub-regions 414S in the interface region increases from the longitudinal centerline of the interface region toward the first zone 414.

As shown in FIG. 21, the sub-regions 414S, 416S are similarly arranged moving from the center row towards the second zone 416. In the row of sub-regions 414S, 416S above the center row in the y-axis direction (i.e., adjacent to the center row on the side of the second zone 414), every third sub-region is a sub-region 414S. In the row of sub-regions 414S, 416S two above the center row in the y-axis direction, every fourth sub-region is a sub-region 414S. In the row of sub-regions 414S, 416S three above the center row in the y-axis direction, all sub-regions are sub-regions 416S. A total area of the sub-regions 416S in the interface region increases from the longitudinal centerline of the interface region toward the second zone 416.

In an embodiment, the depth of the diffractive features within the sub-regions 416S is different than the depth of the diffractive features within the sub-regions 414S. In another embodiment, the depth of the diffractive features from one sub-region 416S to the next sub-region 416S is different, and the depth of the diffractive features from one sub-region 414S to the next sub-region 414S is different.

One benefit of blending the zone interfaces to remove sharp transitions is the reduction in visibility of the transition from one diffractive pattern to another.

Figure 22:
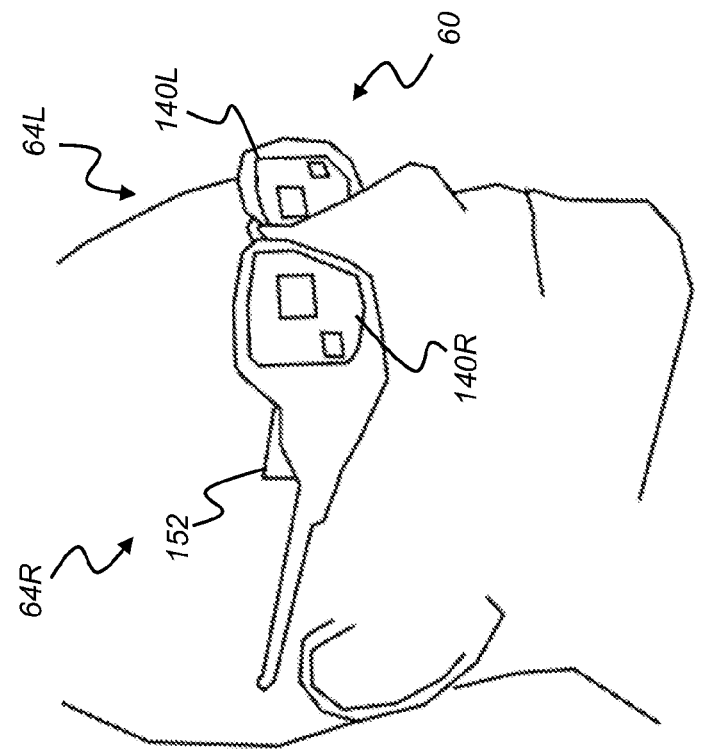
FIG. 22 is a perspective view of a binocular display system for augmented reality viewing using at least one near-focus image light guide according to an exemplary embodiment of the presently disclosed subject matter.

The perspective view of FIG. 22 shows a display system 60 for three-dimensional (3-D) augmented reality viewing using a pair of image light guides of the present disclosure. Display system 60 is shown as an HMD with a left-eye optical system 64L having an image light guide 140L for the left eye and a corresponding right-eye optical system 64R having an image light guide 140R for the right eye. An image source 152, such as a picoprojector or similar device, can be provided, energizable to generate a separate image for each eye, formed as a virtual image with the needed image orientation for upright image display. The images that are generated can be a stereoscopic pair of images for 3-D viewing. The virtual image that is formed by the optical system can appear to be superimposed or overlaid onto the real-world scene content seen by the viewer through an image light guide. Additional components familiar to those skilled in the augmented reality visualization arts, such as one or more cameras mounted on the frame of the HMD for viewing scene content or viewer gaze tracking, can also be provided. Alternate arrangements are possible, including a display apparatus for providing an image to one eye.

One or more features of the embodiments described herein may be combined to create additional embodiments which are not depicted. While various embodiments have been described in detail above, it should be understood that they have been presented by way of example, and not limitation. It will be apparent to persons skilled in the relevant arts that the disclosed subject matter may be embodied in other specific forms, variations, and modifications without departing from the scope, spirit, or essential characteristics thereof. The embodiments described above are therefore to be considered in all respects as illustrative, and not restrictive. The scope of the invention is indicated by the appended claims, and all changes that come within the meaning and range of equivalents thereof are intended to be embraced therein.

What is claimed is:

1. An image light guide for conveying a virtual image, comprising:
   a waveguide;
   an in-coupling diffractive optic operable to direct image-bearing light beams into said waveguide; and
   an out-coupling diffractive optic operable to replicate said image-bearing light beams in two dimensions and direct at least a portion of said image-bearing light beams from said waveguide toward an eyebox;
   wherein said out-coupling diffractive optic comprises
      a first zone located adjacent to a second zone, wherein said first zone comprises a first set of diffractive features and said second zone comprises a second set of diffractive features different from said first set of diffractive features; and
      wherein said first zone and said second zone form an interface region, wherein said interface region comprises one or more first sub-regions and one or more second sub-regions, said first sub-regions comprising said first set of diffractive features and said second sub-regions comprising said second set of diffractive features.

2. The image light guide according to claim 1, wherein said first and second sub-regions are arranged in a pseudo-random configuration within said interface region.

3. The image light guide according to claim 1, wherein said first and second sub-regions describe substantially triangular areas, and said first and second sub-regions alternate along one dimension of said interface region.

4. The image light guide according to claim 1, wherein said first sub-regions are blended with said second sub-regions.

5. The image light guide according to claim 1, wherein a total area of said first sub-regions in said interface region increases from a longitudinal centerline of said interface region toward said first zone, and wherein a total area of said second sub-regions in said interface region increases from said longitudinal centerline of said interface region toward said second zone.

6. The image light guide according to claim 1, wherein said interface region is a first interface region, and wherein said out-coupling diffractive optic comprises:
   a third zone located adjacent to said first zone and said second zone, wherein said third zone comprises a third set of diffractive features; and
   wherein said first zone and said third zone form a second interface region, wherein said second interface region comprises one or more first sub-regions and one or more third sub-regions, said third sub-regions comprising said third set of diffractive features.

7. The image light guide according to claim 6, wherein said first and third sub-regions are arranged in a pseudorandom configuration within the said second interface region.

8. The image light guide according to claim 6, wherein said first and third sub-regions describe substantially triangular areas, and said first and third sub-regions alternate along one dimension of said second interface region.

9. The image light guide according to claim 6, wherein a total area of said first sub-regions in said second interface region increases from a longitudinal centerline of said second interface region to said first zone.

10. The image light guide according to claim 9, wherein a total area of said third sub-regions in said second interface region increases from said longitudinal centerline of said second interface region to said third zone.

11. The image light guide according to claim 6, wherein said out-coupling diffractive optic comprises a third interface region located between said second zone and said third zone, wherein said third interface region comprises one or more second sub-regions and one or more third sub-regions.

12. The image light guide according to claim 11, wherein said second and third sub-regions are arranged in a pseudorandom configuration within the said third interface region.

13. The image light guide according to claim 11, wherein said second and third sub-regions describe substantially triangular areas, and said second and third sub-regions alternate along one dimension of said third interface region.

14. The image light guide according to claim 1, wherein said first and second sub-regions comprise one or more unit cells of periodic diffractive features.

15. The image light guide according to claim 1, wherein said first and second sub-regions are less than 0.15 mm wide.

16. An image light guide for conveying a virtual image, comprising:

a waveguide;

an in-coupling diffractive optic operable to direct image-bearing light beams into said waveguide; and an out-coupling diffractive optic operable to replicate said image-bearing light beams in two dimensions and direct at least a portion of said image-bearing light beams from said waveguide toward an eyebox;

wherein said out-coupling diffractive optic comprises a first zone located adjacent to a second zone, wherein said first zone comprises a first set of diffractive features and said second zone comprises a second set of diffractive features;

wherein said first zone and said second zone form a first interface region, wherein said first interface region comprises one or more first sub-regions and one or more second sub-regions, said first sub-regions comprising said first set of diffractive features and said second sub-regions comprising said second set of diffractive features different from said first set of diffractive features; and a third zone located adjacent to said first zone and said second zone, wherein said third zone comprises a third set of diffractive features;

wherein said first zone and said third zone form a second interface region, wherein said second interface region comprises one or more first sub-regions and one or more third sub-regions, said third sub-regions comprising said third set of diffractive features.

17. The image light guide according to claim 16, wherein said first and third sub-regions are arranged in a pseudorandom configuration within the said second interface region.

18. The image light guide according to claim 16, wherein said first and third sub-regions describe substantially triangular areas, and said first and third sub-regions alternate along one dimension of said second interface region.

19. The image light guide according to claim 16, wherein a total area of said first sub-regions in said second interface region increases from a longitudinal centerline of said second interface region to said first zone, wherein a total area of said third sub-regions in said second interface region increases from said longitudinal centerline of said second interface region to said third zone.

20. An image light guide for conveying a virtual image, comprising:

a waveguide;

an in-coupling diffractive optic operable to direct image-bearing light beams into said waveguide; and an out-coupling diffractive optic operable to replicate said image-bearing light beams in two dimensions and direct at least a portion of said image-bearing light beams from said waveguide toward an eyebox;

wherein said out-coupling diffractive optic comprises a first zone located adjacent to a second zone, wherein said first zone comprises a first set of diffractive features and said second zone comprises a second set of diffractive features, wherein said first zone and said second zone form an interface region, wherein said interface region comprises one or more first sub-regions and one or more second sub-regions, said first sub-regions comprising said first set of diffractive features and said second sub-regions comprising said second set of diffractive features, and wherein said first and second sub-regions are arranged in a pseudorandom configuration within said interface region.

* * * * *